US008685199B2

(12) United States Patent
Dyrlund et al.

(10) Patent No.: US 8,685,199 B2
(45) Date of Patent: Apr. 1, 2014

(54) TIRE PREPARATION PLY MANUFACTURING APPARATUS AND METHOD

(75) Inventors: Christopher David Dyrlund, Akron, OH (US); Donald Chester Kubinski, Medina, OH (US); Jeffrey Ford Bull, Tallmadge, OH (US); Frank A. Edwards, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1601 days.

(21) Appl. No.: 11/424,048

(22) Filed: Jun. 14, 2006

(65) Prior Publication Data
US 2006/0219358 A1    Oct. 5, 2006

Related U.S. Application Data

(62) Division of application No. 10/325,293, filed on Dec. 20, 2002, now Pat. No. 7,073,552.

(51) Int. Cl.
*B29C 65/00* (2006.01)

(52) U.S. Cl.
USPC .................. 156/304.1; 156/304.3; 156/304.7; 156/907

(58) Field of Classification Search
USPC ........... 156/134, 304.1, 304.3, 358, 362, 502, 156/507, 512, 519, 406.4, 906, 907, 304.7
See application file for complete search history.

(56) References Cited

U.S. PATENT DOCUMENTS

| 3,100,731 | A |   | 8/1963  | Brey |
| 3,130,100 | A | * | 4/1964  | Hasselquist .................. 156/157 |
| 3,231,447 | A |   | 1/1966  | Henley et al. |
| 3,325,328 | A | * | 6/1967  | Henley .......................... 156/157 |
| 3,355,343 | A |   | 11/1967 | Beck |
| 3,400,030 | A |   | 9/1968  | Burger |
| 3,433,690 | A |   | 3/1969  | Barns |
| 3,933,565 | A |   | 1/1976  | Printz et al. |
| 3,935,056 | A |   | 1/1976  | Koyama et al. |
| 4,026,753 | A |   | 5/1977  | Printz et al. |

(Continued)

FOREIGN PATENT DOCUMENTS

| DE | 271616 A3  | 9/1989  |
| EP | 0958913 A1 | 11/1999 |

(Continued)

OTHER PUBLICATIONS

Japanese Patent Office, translation of Office Action issued in related Japanese Patent Application No. 2003-422582 dated Aug. 14, 2009.

*Primary Examiner* — Geoffrey L Knable
(74) *Attorney, Agent, or Firm* — Wood, Herron & Evans LLP

(57) ABSTRACT

An apparatus for forming a continuous preparation ply of the type used to make vehicle tires from preparation ply sections having nonmetallic cords. An infeed conveyor successively feeds the preparation ply sections to a butt splicing machine that joins the ends of the two preparation ply sections to form a butt joint. A gum strip applier receives the continuous preparation ply from an outfeed conveyor and applies a gum strip over the butt joint. A method is provided for forming a continuous preparation ply by first automatically forming a butt joint, and thereafter automatically placing a gum strip on the butt joint.

11 Claims, 22 Drawing Sheets

(56) References Cited

U.S. PATENT DOCUMENTS

| | | |
|---|---|---|
| 4,034,617 A | 7/1977 | Guyer |
| 4,054,475 A | 10/1977 | Bottasso et al. |
| 4,257,630 A | 3/1981 | Bartell et al. |
| 4,257,837 A | 3/1981 | Lucas |
| 4,322,462 A | 3/1982 | Lucas |
| 4,411,724 A | 10/1983 | Ito et al. |
| 4,466,473 A | 8/1984 | Matyja et al. |
| 4,552,602 A * | 11/1985 | Landsness .................... 156/157 |
| 4,765,862 A | 8/1988 | Azuma |
| 4,867,823 A * | 9/1989 | Pizzorno ....................... 156/157 |
| 4,871,004 A | 10/1989 | Brown et al. |
| 4,954,205 A | 9/1990 | Agawa |
| 5,007,974 A | 4/1991 | Maathuis et al. |
| 5,073,226 A | 12/1991 | Suzuki et al. |
| 5,164,031 A | 11/1992 | Matsuyama et al. |
| 5,205,468 A | 4/1993 | Budenbender |
| 5,221,409 A | 6/1993 | Hart et al. |
| 5,405,477 A | 4/1995 | Arnold |
| 5,428,705 A | 6/1995 | Hermsen et al. |
| 5,514,233 A | 5/1996 | Miyamoto |
| 5,571,371 A | 11/1996 | Senbokuya |
| 5,690,776 A | 11/1997 | Anderson |
| 5,709,760 A | 1/1998 | Prakash et al. |
| 5,755,904 A | 5/1998 | Longo et al. |
| 6,364,981 B1 | 4/2002 | Smith et al. |
| 6,368,439 B1 | 4/2002 | Bender et al. |
| 6,369,353 B1 | 4/2002 | Soska |
| 6,390,406 B1 | 5/2002 | Wood |
| 6,405,146 B1 | 6/2002 | Engel |
| 6,413,342 B1 | 7/2002 | Yun et al. |
| 6,415,197 B1 | 7/2002 | Prewitt |
| 6,418,625 B1 | 7/2002 | Baum |
| 6,439,090 B1 | 8/2002 | Wilson et al. |

FOREIGN PATENT DOCUMENTS

| | | | |
|---|---|---|---|
| EP | 1358999 A1 | | 11/2003 |
| JP | 59145128 A | * | 8/1984 |
| JP | 62187020 A | | 8/1987 |
| WO | WO-00/46013 A1 | * | 8/2000 |

* cited by examiner

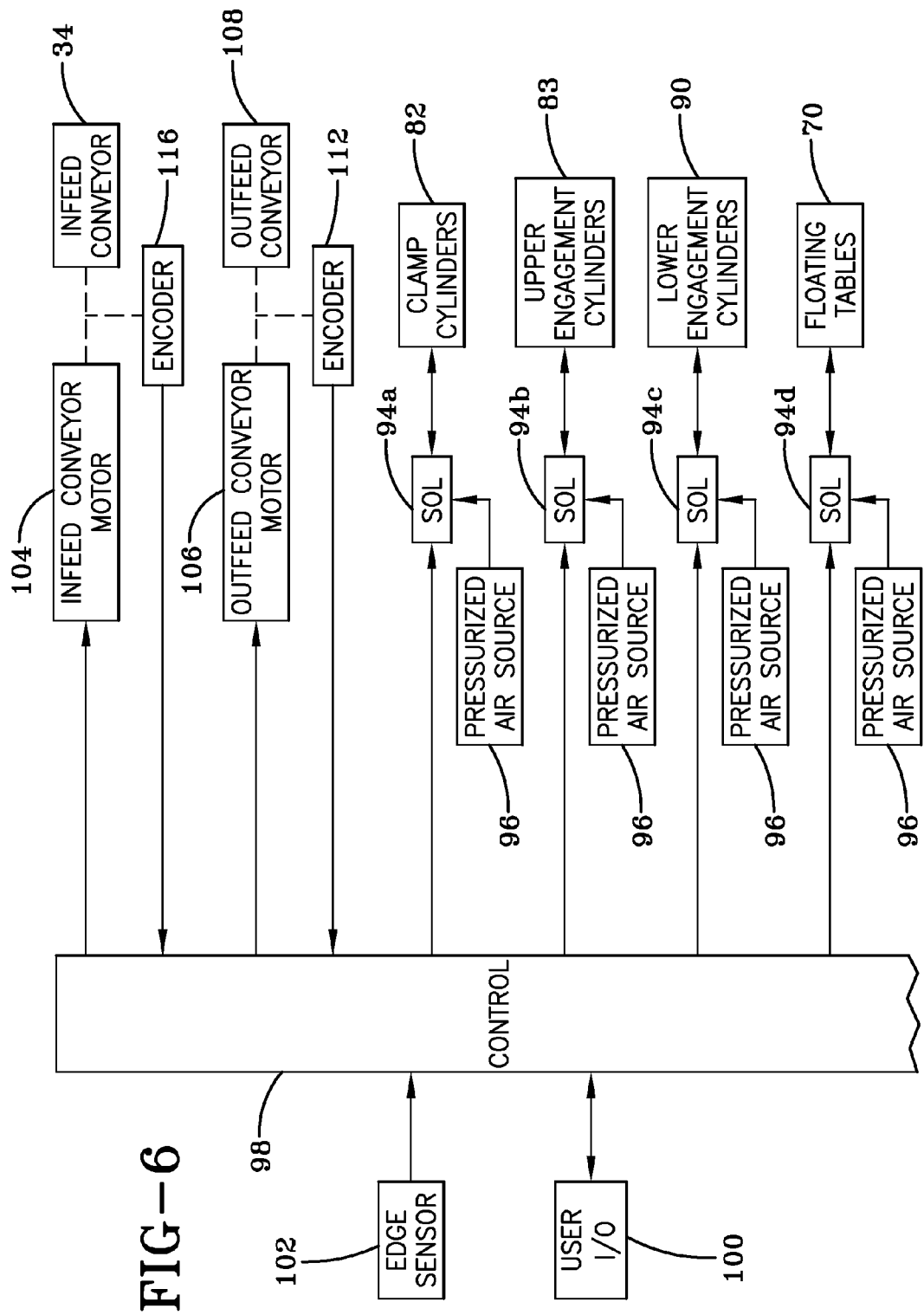

TIRE PREPARATION PLY MANUFACTURING APPARATUS AND METHOD

This application is a Divisional of U.S. patent application Ser. No. 10/325,293, filed on Dec. 20, 2002, the entirety of which is hereby incorporated by reference herein.

FIELD OF THE INVENTION

This invention relates generally to apparatus and method for producing a continuous preparation ply material for making tires and more particularly, to an apparatus and method for making a continuous web of preparation ply material having transverse nonmetallic reinforcing cords.

BACKGROUND OF THE INVENTION

In the construction of a radial ply tire, a carcass consisting of one or more preparation plies of elastomeric material is built up on a generally cylindrical drum. The preparation ply is applied so that reinforcing cords run from bead to bead in a direction that is generally parallel to the axis of the drum. Thus, prior to making the carcass, the preparation ply with the transversely extending reinforcing cords must first be made.

It is known to manufacture the preparation ply by first producing a sheet of elastomeric material in which reinforcing cords extend longitudinally. During production, the sheet of elastomeric material passes between calendering rolls. The calendered sheet of material is then cut into quadrilateral, for example, rectangular pieces, reoriented and the calendered edges are then spliced together to form a continuous strip of preparation ply material. The reorientation results in the reinforcing cords extending substantially parallel to the splice joints and substantially perpendicular to the longitudinal direction of the preparation ply strip.

If the elastomeric material has metallic reinforcing cords, the lateral calendered edges of the material have relatively straight and uniform edges. Thus, in the manufacture of a preparation ply that has metallic reinforcing cords, the adjacent ends of the strips are placed in direct opposition and brought together without any overlap of the ends to form an end-to-end or butt joint splicing the two ends together. Thus, the ends are held together only by the tackiness of the uncured rubber over the area of the adjacent ends. Metallic reinforcing cords provide a relatively linear calendered edge that is suitable for a butt splice bond created by the tackiness of the elastomeric material.

However, if the elastomeric material has nonmetallic reinforcing cords, the lateral calendered edges of the material are not straight but undulating. Such curved calendered edges provide a nonuniform and variable gap between the adjacent ends of the pieces and thus, are generally not considered suitable for a butt splice. Consequently, although a butt splice would be preferred in the manufacture of a preparation splice, an overlapping splice is often used to join the cut pieces having nonmetallic reinforcing cords.

Therefore, there is a need for improved apparatus and method for automatically making a preparation ply with butt splices. More particularly, there is a need for apparatus and methods for automatically butt splicing together a preparation ply having nonmetallic reinforcing cords.

SUMMARY OF THE INVENTION

In a first embodiment of the present invention, an apparatus is provided that automatically butt splices a preparation ply having metallic or nonmetallic reinforcing cords. The apparatus is relatively simple in design and less expensive than other machinery used to butt splice a preparation ply. The apparatus of the present invention provides a high quality butt splice regardless of the reinforcing cord material and therefore, is especially useful in making a preparation ply having nonmetallic reinforcing cords.

More specifically, the first embodiment of the invention provides an apparatus for forming a butt joint between ends of first and second plies to splice the plies together. The apparatus has pairs of upper racks that extend end-to-end; and each pair of upper racks has first and second upper racks that are movable with respect to each other. In addition, pairs of lower racks extend end-to-end adjacent the pairs of upper racks; and each pair of lower racks has first and second lower racks that are movable with respect to each other. The first and second lower racks support ends of first and second plies, respectively. A clamp drive is connected to the pairs of upper racks and is operable to move the upper racks toward the lower racks to clamp the ends of the first and second plies between the upper and lower racks. An engagement drive is connected to the upper and lower racks and is operable to simultaneously move all of the first and second racks with respect to each other to firmly press the ends of the first and second plies together, thereby forming a butt joint splicing the ends of the first and second plies together.

In another embodiment of this invention, a method is provided for positioning an end of a first material ply section over teeth of the first lower racks and positioning an end of a second material ply section over teeth of the second lower racks. Next, the first and second material ply sections are clamped between the pairs of upper racks and the pairs of lower racks. Then, the teeth of all the first upper and lower racks are simultaneously engaged with the teeth of all the second upper and lower racks to firmly press the ends of the first and second material plies together to form a butt joint that splices the first and second material plies together.

In a second embodiment of the present invention, an apparatus is provided that automatically applies a gum strip to a butt joint joining two preparation plies together. The apparatus is fast, reliable and automatically operable with the butt splicer described herein and therefore, is especially useful in making a preparation ply having nonmetallic reinforcing cords.

More specifically, the second embodiment of the invention provides an apparatus having a conveyor for providing a gum strip of a desired length. A transfer device then automatically removes the gum strip from the conveyor and places the gum strip on the butt joint.

In a further embodiment of this invention, a method is provided for applying a gum strip over a butt joint splicing ends of first and second preparation plies by first providing a gum strip having a desired length and then, automatically placing the gum strip on the butt joint.

In a third embodiment of the present invention, an apparatus is provided that automatically forms a continuous preparation ply of the type used to make vehicle tires from preparation ply sections having nonmetallic cords. Being able to economically, efficiently and reliably butt splice preparation plies provides a higher quality tire manufacturing process.

More specifically, the second embodiment of the invention provides an apparatus having an infeed conveyor for successively feeding the preparation ply sections, and a butt splicing machine that receives the preparation ply sections from the infeed conveyor. The butt splicing machine joins the ends of the two preparation ply sections to form a butt joint splicing the two preparation plies together to form a continuous preparation ply. An outfeed conveyor feeds the continuous preparation ply from the butt splicing machine, and a gum strip applier applies a gum strip on the butt joint of the continuous preparation ply on the outfeed conveyor.

In another embodiment of this invention, a method is provided for forming a continuous preparation ply by first automatically forming a first butt joint splicing two preparation plies together to form a continuous preparation ply having nonmetallic cords that extend in a direction substantially parallel to the butt joint. Thereafter, a gum strip is automatically placed on the first butt joint.

These and other objects and advantages of the present invention will become more readily apparent during the following detailed description taken in conjunction with the drawings herein.

BRIEF DESCRIPTION OF THE DRAWINGS

FIGS. 6 and 6A are schematic block diagrams of a control system used to control the operation of the butt splicer and gum strip applier of FIG. 1.

DETAILED DESCRIPTION OF THE INVENTION

Figure 1:
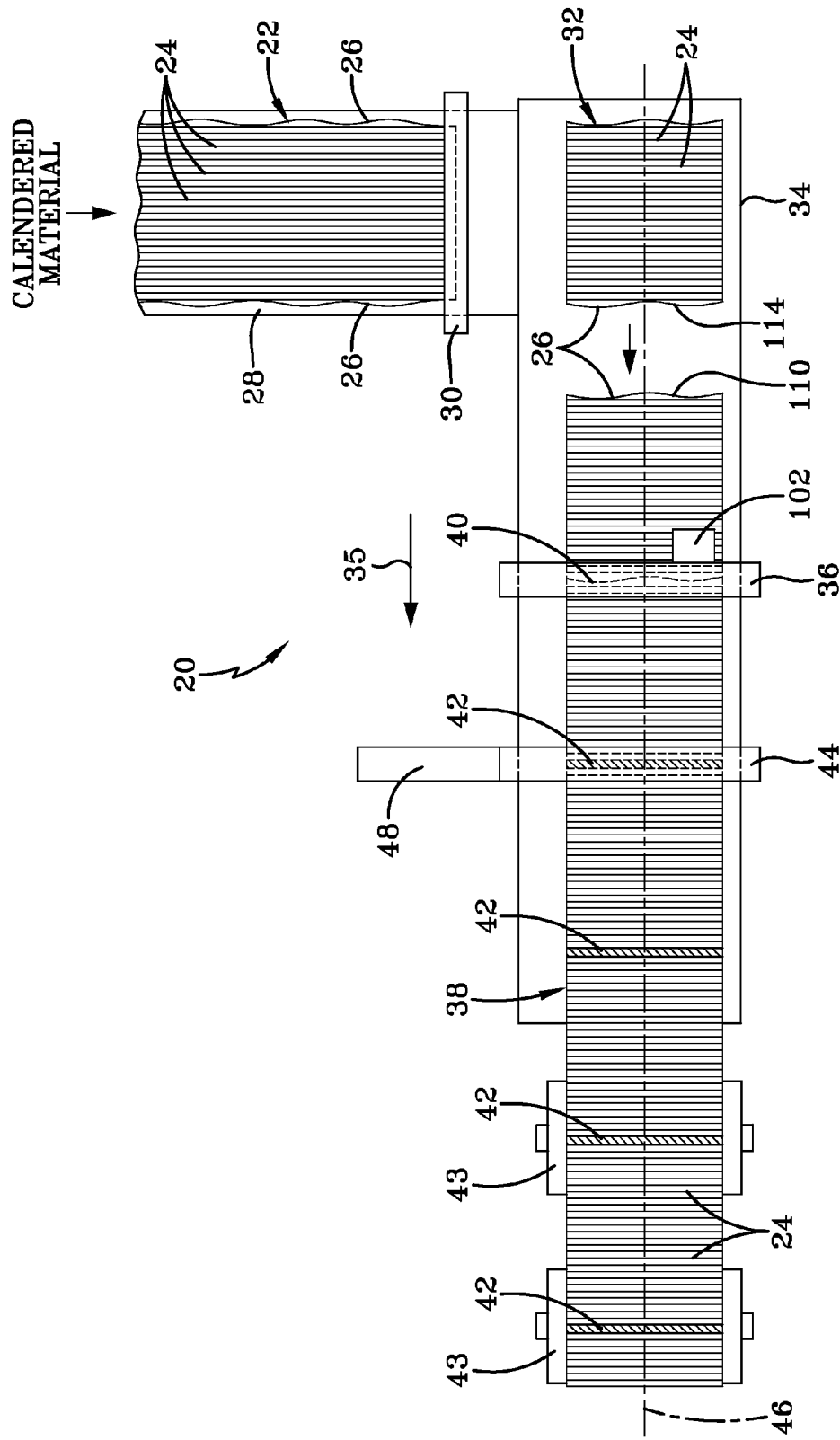
FIG. 1 is a schematic illustration of a nonmetallic cord preparation ply manufacturing line having a butt splicer and gum strip applier in accordance with the principles of the present invention.

Referring to FIG. 1, in a preparation ply manufacturing line 20, a strip of calendered material 22 is fed from calender rolls (not shown) in a known manner. The calendered material 22 is about 0.040-0.060 inch thick and has cords 24 made from a nonmetallic material, which extend longitudinally generally parallel to the calendered edges 26. The nonmetallic cords 24 being less rigid than metallic cords result in the calendered edges 26 being nonlinear and undulating. The calendered material is fed by a conveyor 28 past a cutter 30, which cuts the calendered material to desired lengths, depending on the application. The resulting rectangular pieces 32 are then transferred onto a transverse infeed conveyor 34. The pieces are then conveyed in a downstream direction 35 to a butt splicing machine 36 that forms butt joints 40 between the calendered edges 26 of the cut pieces 32 to form a continuous preparation ply strip 38. The butt joints 40 are reinforced by respective gum strips 42 that are placed over the joints 40 by a gum strip applier 44. The resulting continuous preparation ply strip is collected on windup rolls 43 in a known manner. The continuous preparation ply strip 38 has nonmetallic cords 24 that are substantially parallel to the butt joints 40 and gum strips 42 and are transverse to a longitudinal axis 46 of the preparation ply strip 38.

For purposes of this description, the term "downstream" is used to identify the direction of motion of the preparation ply material 38 through the butt splicer 36 and gum strip applier 44, that is, from right to left as viewed in FIG. 1. The term "upstream" is used to designate a motion in an opposite direction. Components on the butt splicer 36 that are identified as "downstream" are located closer to the gum strip applier 44 than components identified as being "upstream".

Figure 2:
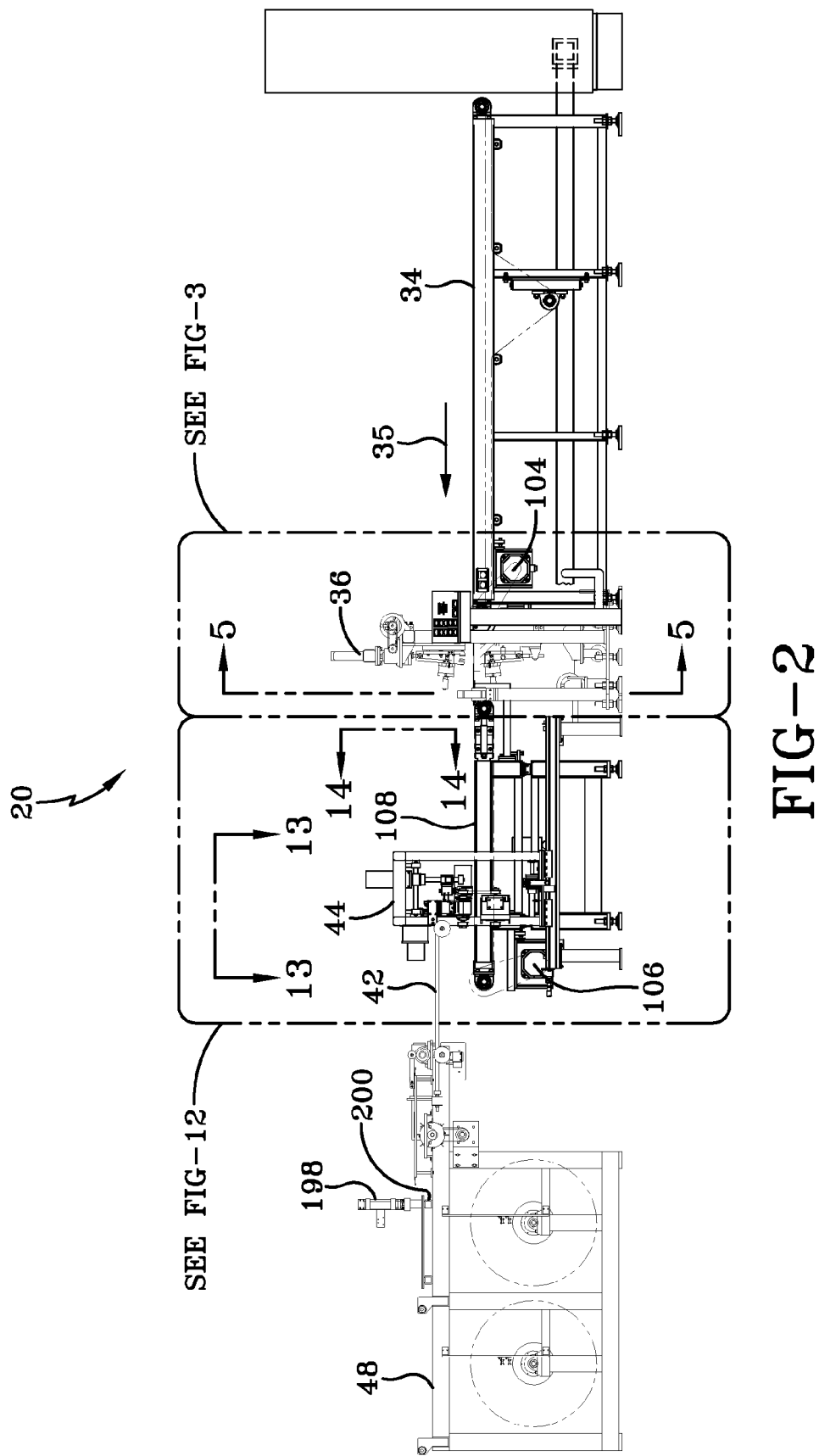
FIG. 2 is a side view of the butt splicer and the gum strip applier of FIG. 1.

FIG. 2 is a side view of a portion of the preparation ply manufacturing line 20, a strip of calendered material 22 that includes the infeed conveyor 34, butt splicer 36 and gum strip applier 44. It should be noted that except for the butt splicer 36 and gum strip applier 44, all of the elements of FIG. 1 are known and used in the tire manufacturing industry. It should also be noted that preparation equipment 48 for the gum strip applier 44, which feeds the gum strip from a roll and separates and winds up a covering over the gum strip adhesive is also known.

Figure 4:
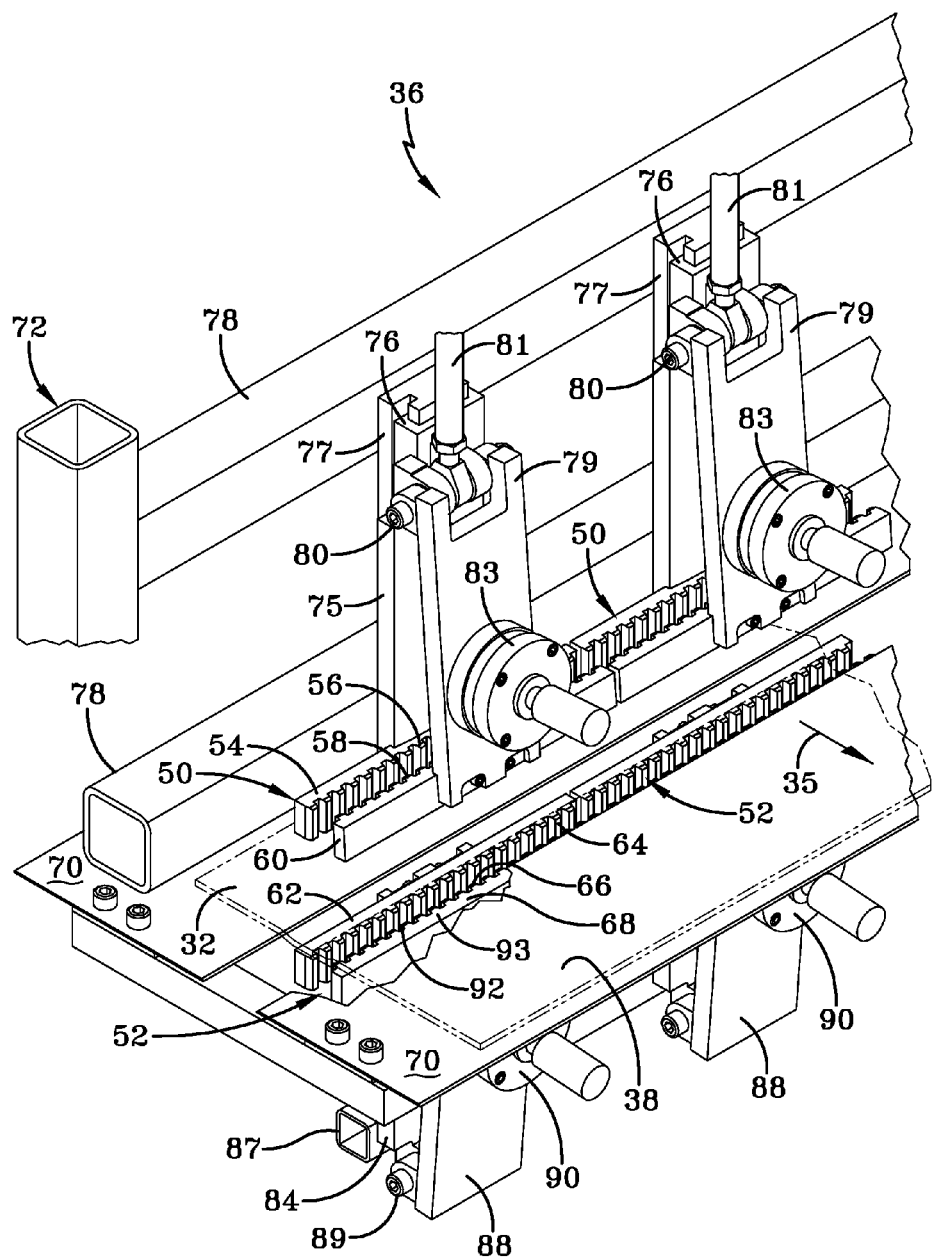
FIG. 4 is a partial perspective view of a portion of the butt splicer of FIG. 2 that illustrates the plurality of pairs of upper and lower racks.
Figure 5:
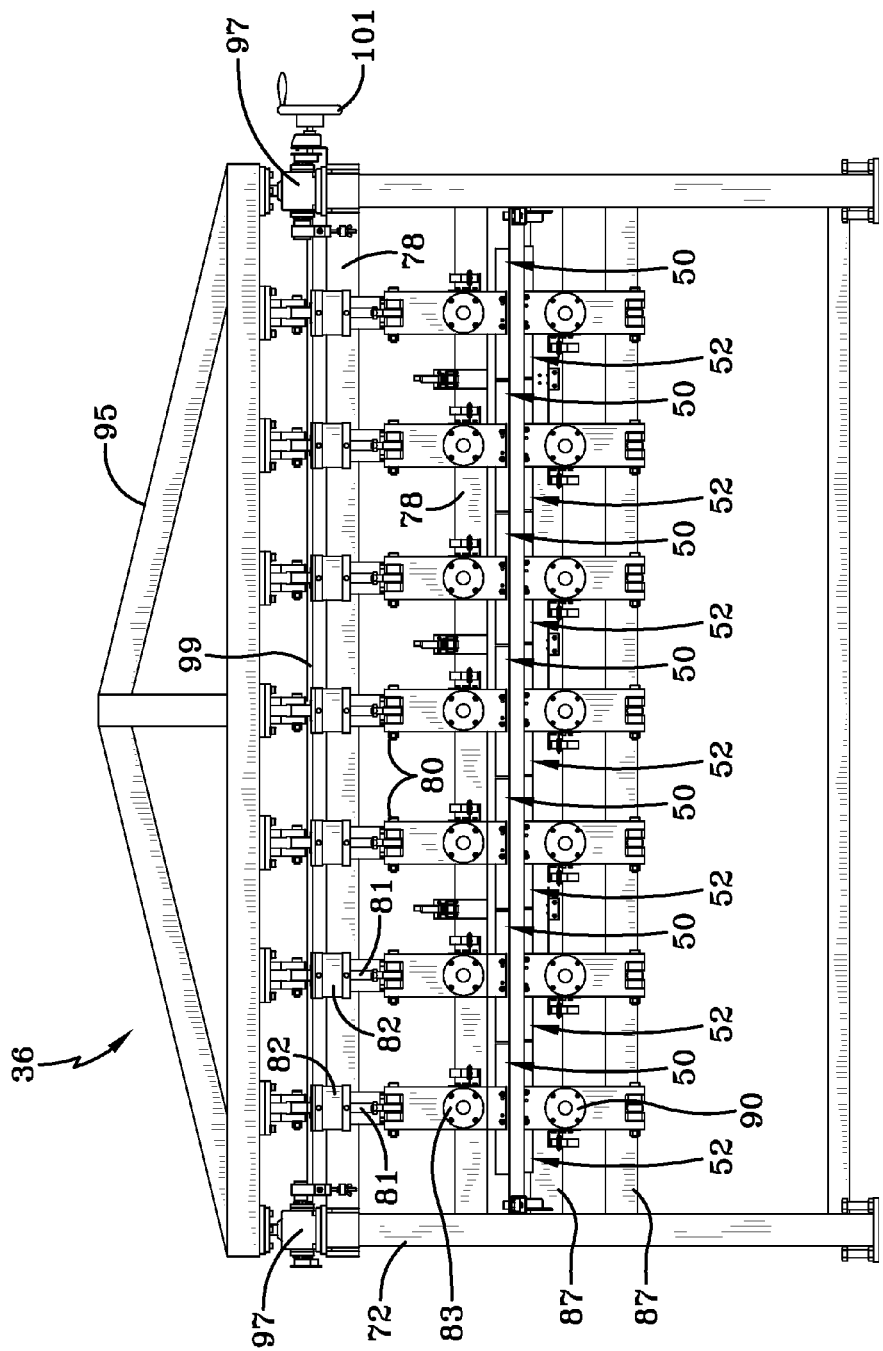
FIG. 5 is an end view of the butt splicer of FIG. 2.

Referring to FIGS. 4 and 5, the butt splicing machine 36 has a frame 72 that supports floating tables 70 on both the upstream and downstream sides of the butt splicer 36. Pairs of upper racks 50 and pairs of lower racks 52 are mounted to extend transversely across the width of the butt splicing machine. Each pair of upper racks 50 is comprised of a nonpivotable, upstream rack 54 having teeth 56 that are engageable with teeth 58 of a pivotable, downstream rack 60. Similarly, each pair of lower racks 52 is comprised of a nonpivotable, upstream rack 62 having teeth 64 that are engageable with teeth 66 of a pivotable, downstream rack 68. The pairs of lower racks 52 are fixed in elevation immediately adjacent the table 70 that supports the cut strips 32 as they are fed by the infeed conveyor 34 to the butt splicer 36. The racks 54, 60, 62, 68 are commercially available gear racks.

Each of the upper, upstream racks 54 is mounted to a lower end of a respective upper, nonpivotable, upstream jaw mounting bracket 75 that is mounted on a slide 76. The slide 76 is slidably mounted on a linear guide 77 that is fixed to an upper pair of cross rails 78 of the frame 72. Each of the upper, downstream racks 60 is mounted to a lower end of a respective upper, pivotable, downstream jaw mounting bracket 79. Upper ends of each of the upper jaw mounting brackets 75, 79 are mechanically connected to a clamp drive comprised of a respective upper clamping actuator 82, for example, a pneumatic cylinder, as shown in FIG. 5. The cylinders 82 are mounted to a truss 95 that is mounted on gearboxes 97 on the frame 72. The gearboxes 97 are connected by a shaft 99 and operated by a handwheel 101. Thus, turning the handwheel 101 permits the vertical position of the cylinders 82 and the upper pairs of racks 50 to be adjusted. The upper ends of each of the jaw mounting brackets 75, 79 are pivotally connected via a pivot pin 80 to a distal end of a cylinder rod 81 of a respective cylinder 82. Simultaneous operation of the cylinders 82 in one state is operative to simultaneously move the upper jaw mounting brackets 75, 79 and respective pairs of upper racks 50 downward toward the pairs of lower racks 52. Reversing the operation of the cylinders 82 is operative to move the upper racks 50 away from the lower racks 52.

Figure 3:
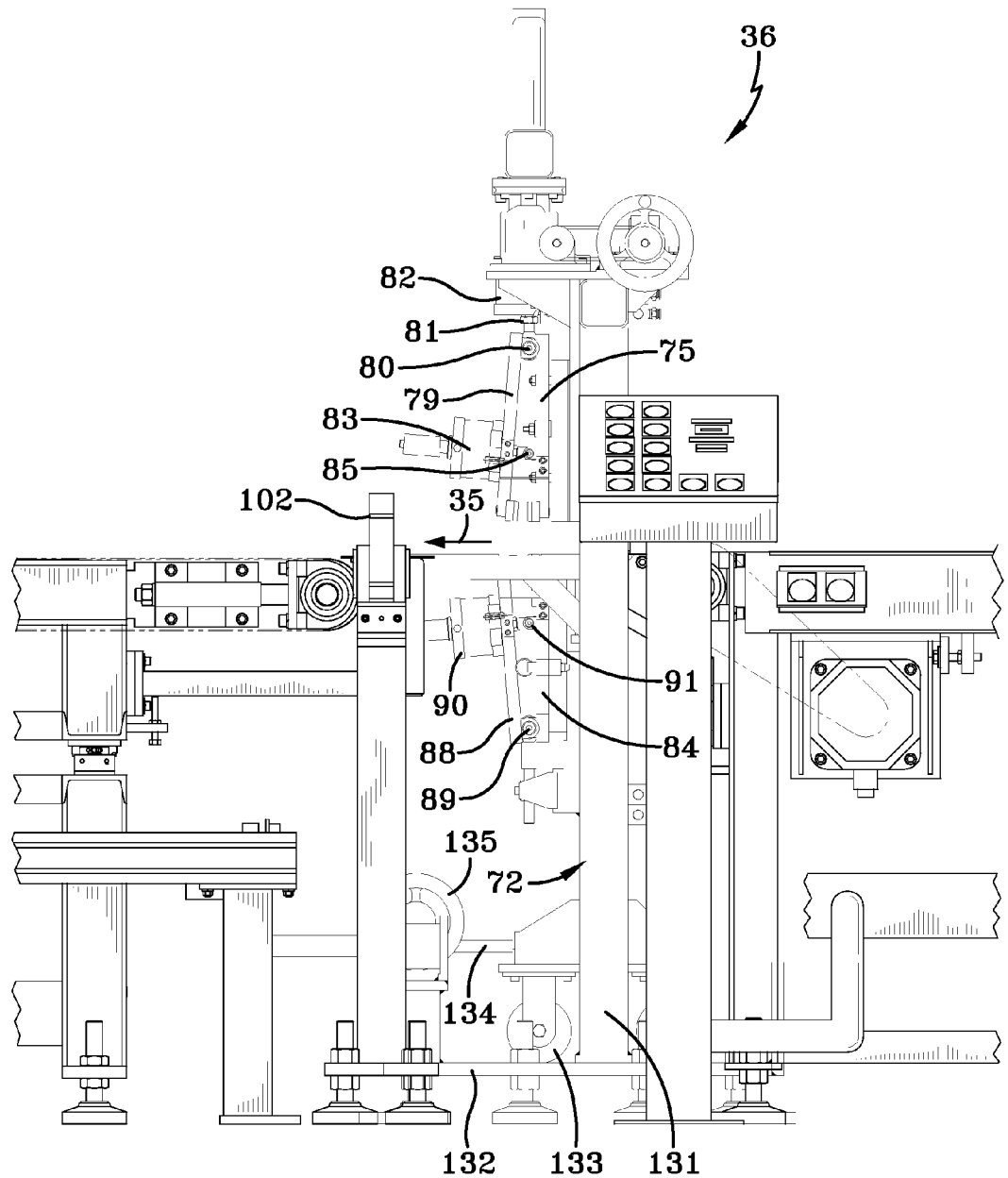
FIG. 3 is a side view of the butt splicer of FIG. 2.

As shown in FIG. 4, the upper, downstream racks 60 are pivotable with respect to respective upper, upstream racks 54 by means of an engagement drive comprised of respective upper engagement actuators 83, for example, a pneumatic cylinder. Specifically, the cylinders 83 are mounted on respective upper, downstream jaw mounting brackets 79; and as shown in FIG. 3, distal ends of respective cylinder rods 85 are connected to respective opposed, upper, upstream jaw mounting brackets 75. Simultaneous operation of the engagement cylinders 83 in one state causes the upper, downstream jaw mounting brackets 79 and respective upper, downstream racks 60 to pivot toward the upper, upstream jaw mounting brackets 75 and the respective upper, upstream racks 54, thereby engaging their respective teeth 58, 56. Reversing the operation of the engagement cylinders 83 causes the upper, downstream racks 60 to move simultaneously away from the upper rear racks 54, thereby disengaging their respective teeth 58, 56.

Each of the lower, upstream racks 62 is mounted to a lower end of a respective lower, upstream, nonpivotable jaw mounting bracket 84 that is attached to a lower pair of cross rails 87 fixed to the frame 72. Each of the lower, downstream racks 68 is mounted to a lower end of a respective lower, pivotable, downstream jaw mounting bracket 88. Upper ends of each of the lower jaw mounting brackets 84, 88 are pivotally connected via a pivot pin 89. The lower, downstream racks 68 are pivotable with respect to respective lower, upstream racks 62 by means of an engagement drive comprised of respective lower engagement actuators 90, for example, a pneumatic cylinder. Specifically, the cylinders 90 are mounted on respective lower, downstream jaw mounting brackets 88; and as shown in FIG. 3, distal ends of respective cylinder rods 91 are connected to respective lower, upstream jaw mounting brackets 84. Simultaneous operation of the engagement cylinders 90 in one state causes the lower, downstream jaw mounting brackets 88 and respective lower, downstream racks 68 to pivot toward the lower, upstream jaw mounting brackets 84 and the respective lower, upstream racks 62, thereby engaging their respective teeth 66, 64. Reversing the operation of the engagement cylinders 90 causes the lower, downstream racks 68 to move simultaneously away from the lower, upstream racks 62, thereby disengaging their respective teeth 66, 64.

Figure 6A:
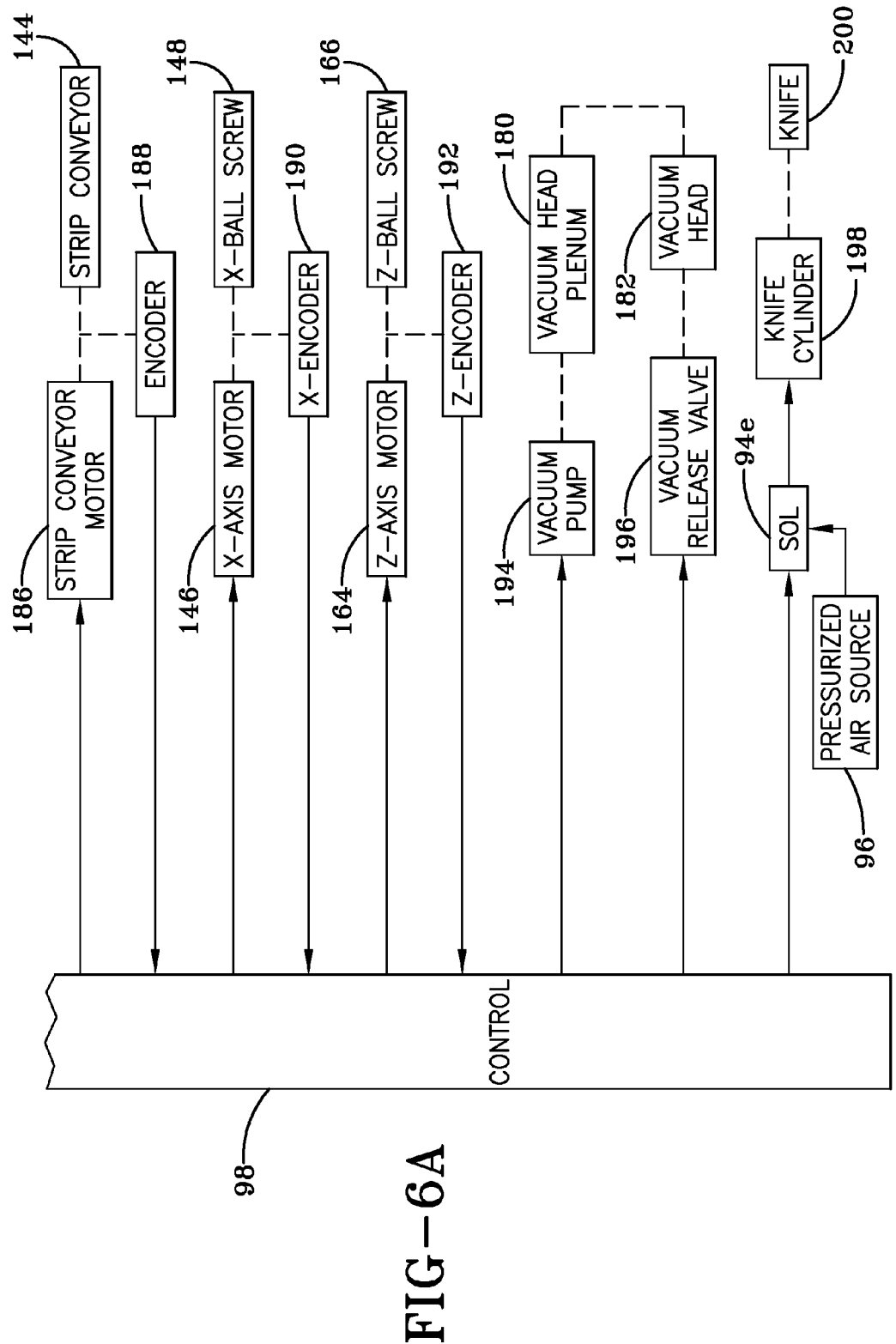

Referring to FIG. 6, the operation of the floating table 70 and cylinders 90, 82, 83 are controlled by the operation of solenoids 94 that port pressurized air from a source 96 in a known manner. The operational states of the solenoids are commanded by output signals from a control 98, for example, a programmable logic controller or other microcontroller. The operation of the control 98 is controlled by input devices, for example, a user I/O 100, an edge sensor 102, etc. The control 98 also provides output signals that command the operation of an infeed conveyor motor 104 (FIG. 2) and an outfeed conveyor motor 106 that operate the respective infeed and outfeed conveyors 34, 108.

Figure 7:
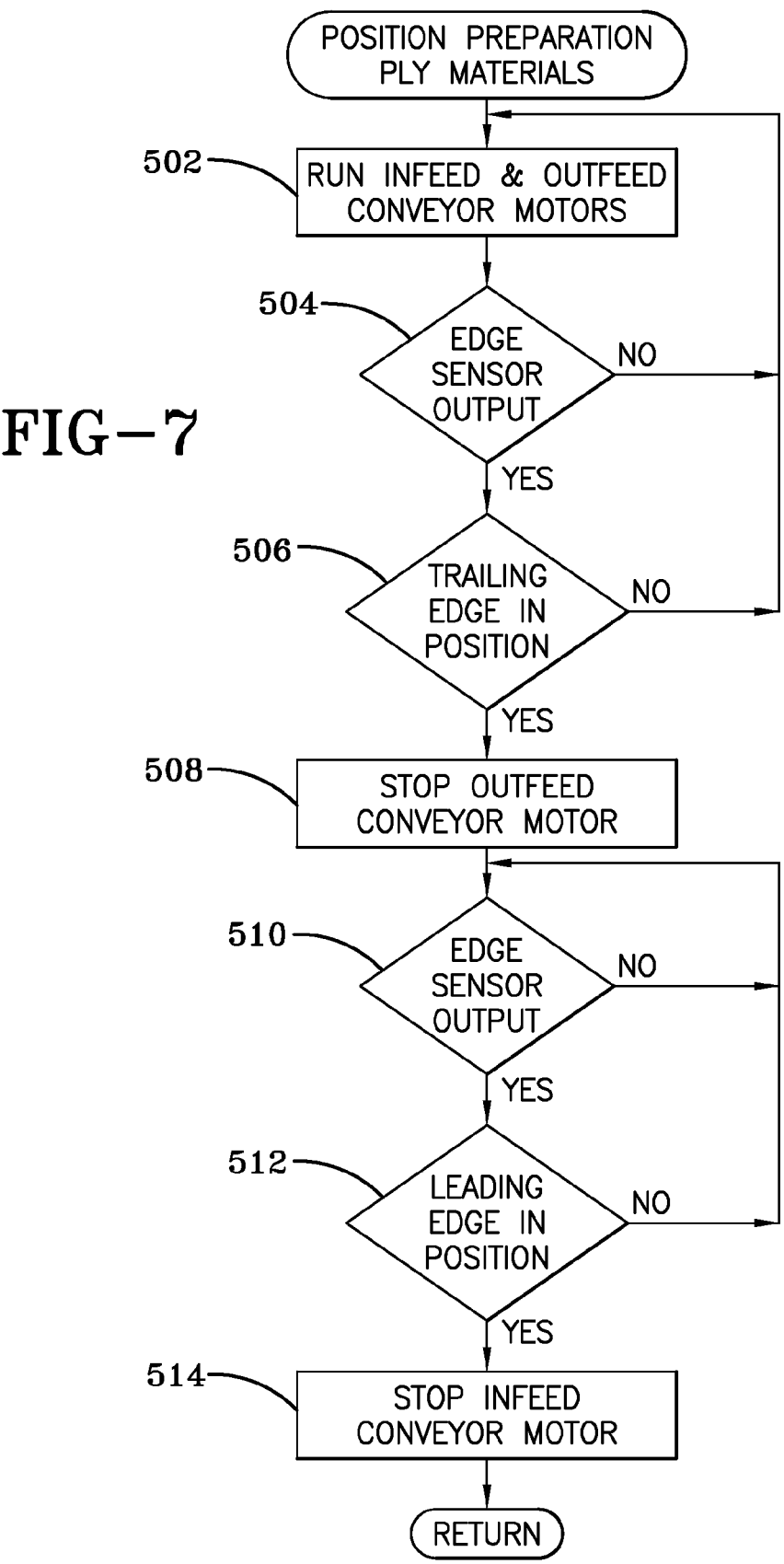
FIG. 7 is a flowchart of a subroutine implemented by the control system of FIG. 6 for positioning a preparation ply piece prior to a butt splicing cycle.
Figure 8:
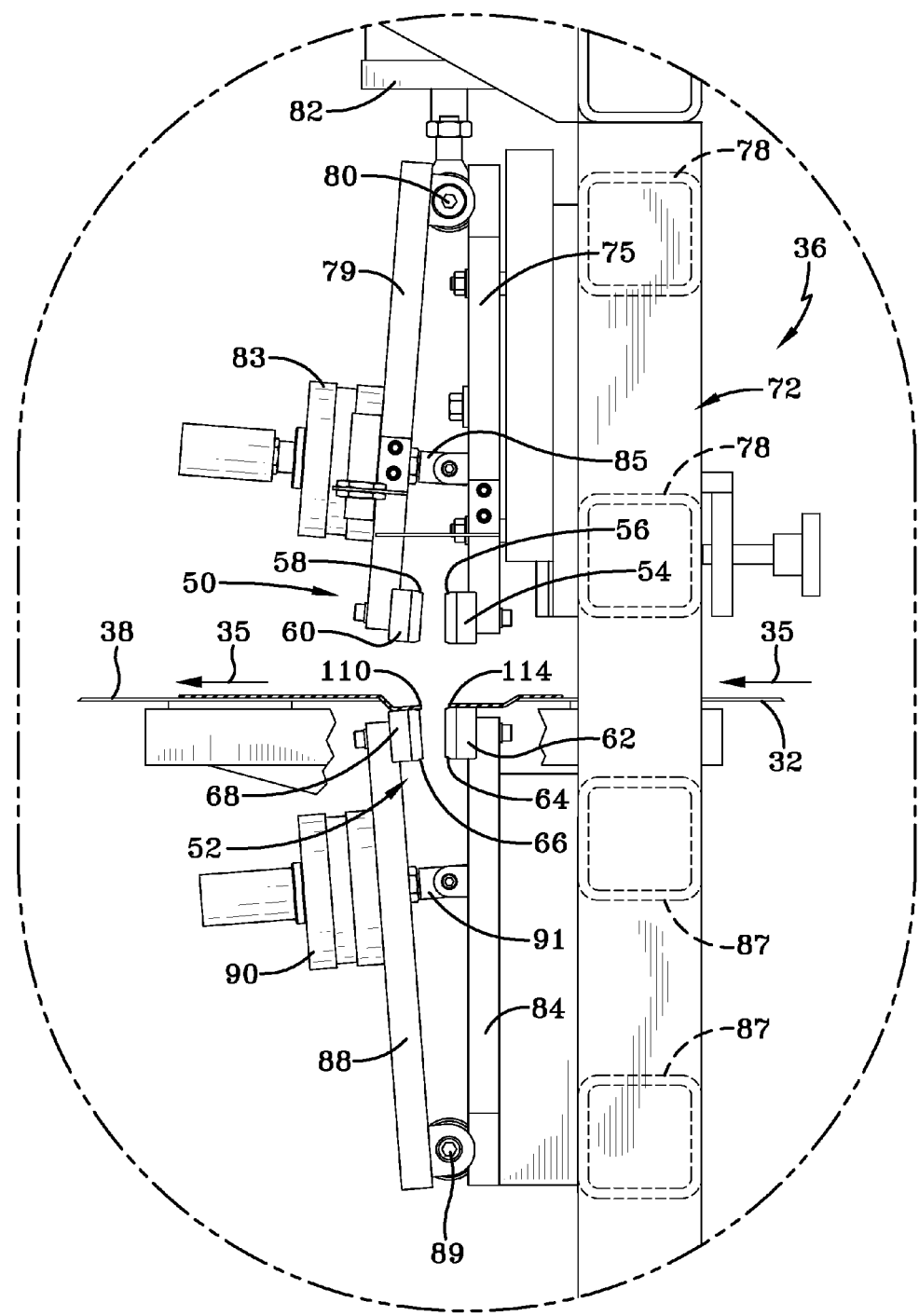
FIGS. 8-8C are end views illustrating different states of racks on the butt splicer of FIG. 1 in executing the butt splicing cycle of FIG. 6.

The operation of the butt splicer 36 is controlled by various cycles of operation that are programmed in the control 98 in a known manner as a group of subroutines. For example, a first subroutine illustrated in FIG. 7 is effective to position cut pieces 32 in the butt splicer 36 in preparation for making the butt joint. The process of FIG. 5 starts with a preparation ply in the butt splicer 36 and a butt joint has just been completed. Referring to FIGS. 1, 2, 6 and 7, to position the preparation ply 38 and a new cut piece 32 for the next splice, the control 98 provides, at 502, output signals to cause the infeed and outfeed conveyor motors 104, 106, respectively, to run. At the same time, the control 98 provides an output signal to solenoid 94d causing it to switch state and port pressurized air to the floating tables 70. Thus, material can be moved over the butt splicer 36 with minimal friction from a subjacent support. Simultaneous operation of the infeed and outfeed conveyors 34, 108 causes the preparation ply strip 38 to move in a downstream direction 35 as viewed in FIGS. 1, 2 and 8. That motion of the preparation ply strip 38 results in a trailing edge 110 (FIG. 8) passing beneath an edge sensor 102 mounted on the butt splicer 36. Upon detecting the trailing edge 110, the edge sensor 102 provides an output signal, at 504, to the control 98.

The control 98 then monitors the operation of the outfeed conveyor 108 to determine when the trailing edge 110 has been moved to a desired position with respect to the teeth 66 of the lower, downstream rack 68. The distance between the point at which the trailing edge 110 is sensed by the edge sensor 102 and the final position of the trailing edge 110 on the lower, downstream rack 68 is a known value. Therefore, the operation of the outfeed conveyor motor 106 can be precisely controlled such that the outfeed conveyor 108 is stopped when the trailing edge 110 is at its desired position on the lower, downstream rack 68. The desired position of the trailing edge varies depending on the design of the butt splicer 36, the depth of the teeth of the racks, the nature of the preparation ply material, etc. The desired position of the trailing edge 110 is back from the front edges of the teeth 66 of the lower, downstream rack 68. However, the desired amount of setback of the trailing edge 110 is determined experimentally in each application and may, for example, be a distance equal to somewhat less than half the length of the teeth 66.

Detecting when the trailing edge 110 is in position may be accomplished in several ways. In one embodiment, the outfeed conveyor motor 106 has an encoder 112 attached thereto; and each output pulse from the encoder represents an incremental displacement of the outfeed conveyor 108. Thus, the control 98 can detect and count output pulses from the encoder 112 and detect, at 506, when the trailing edge 110 is at its desired position on the teeth 66 of the lower, downstream rack 68. In an alternative embodiment, if the speed of the outfeed conveyor 108 is fixed, the control 98 can start an internal timer that counts the milliseconds required to move the trailing edge 110 from its position under the edge sensor 102 to a desired position on the teeth 66 of the lower, downstream rack 68. In either event, when the control 98 determines, at 506, that the trailing edge is at its desired position, it provides, at 508, an output signal to the outfeed conveyor motor 106 commanding it to stop. In addition, the control 98 provides an output signal switching the state of solenoid 94d to remove the supply of pressurized air from the downstream floating table 70, thereby providing a more rigid support for the cut piece 38.

Simultaneously, with moving of the preparation ply 38, the operation of the infeed conveyor 34 by the control 98 is also causing a new cut piece 32 to move in the downstream direction 35 toward the butt splicer 36. After detecting the trailing edge 110 of the preparation ply 38, the edge sensor 102 detects the leading edge 114 of the next cut piece 32 to be spliced to the preparation ply strip 38; and its output changes state at 510. Upon the control 98 detecting that change of state, it starts counting pulses from an encoder 116 that is connected to the infeed conveyor motor 104. By counting encoder pulses, the control 98 is able to determine when the leading edge 114 is at a desired position on the teeth 64 of the lower, upstream rack 62. Again, the desired position of the leading edge 114 varies depending on the design of the butt splicer 36, the depth of the teeth of the racks, the nature of the preparation ply material, etc. The desired position of the leading edge 114 is determined in the same way as described with respect to the desired position of the trailing edge 110. Upon the control 98 detecting, at 512, the desired position of the leading edge 114, it provides, at 514, an output signal to the infeed conveyor motor 104 commanding it to stop. It should be noted that the infeed conveyor 34 and outfeed conveyor 108 normally have about equal speeds, however, the outfeed conveyor may be run slightly faster than the infeed conveyor to increase the gap between the trailing edge 110 of the preparation ply 38 and the leading edge of the ply section 32 during conveyance.

In addition, the control 98 provides an output signal switching the state of solenoid 94d to remove the supply of pressurized air from the upstream floating table 70, thereby providing a more rigid support for the cut piece 32. At this point, the edges 110, 114 are at desired locations on respective teeth 66, 64 of the lower rear and forward racks 68, 62, respectively.

Figure 8A:
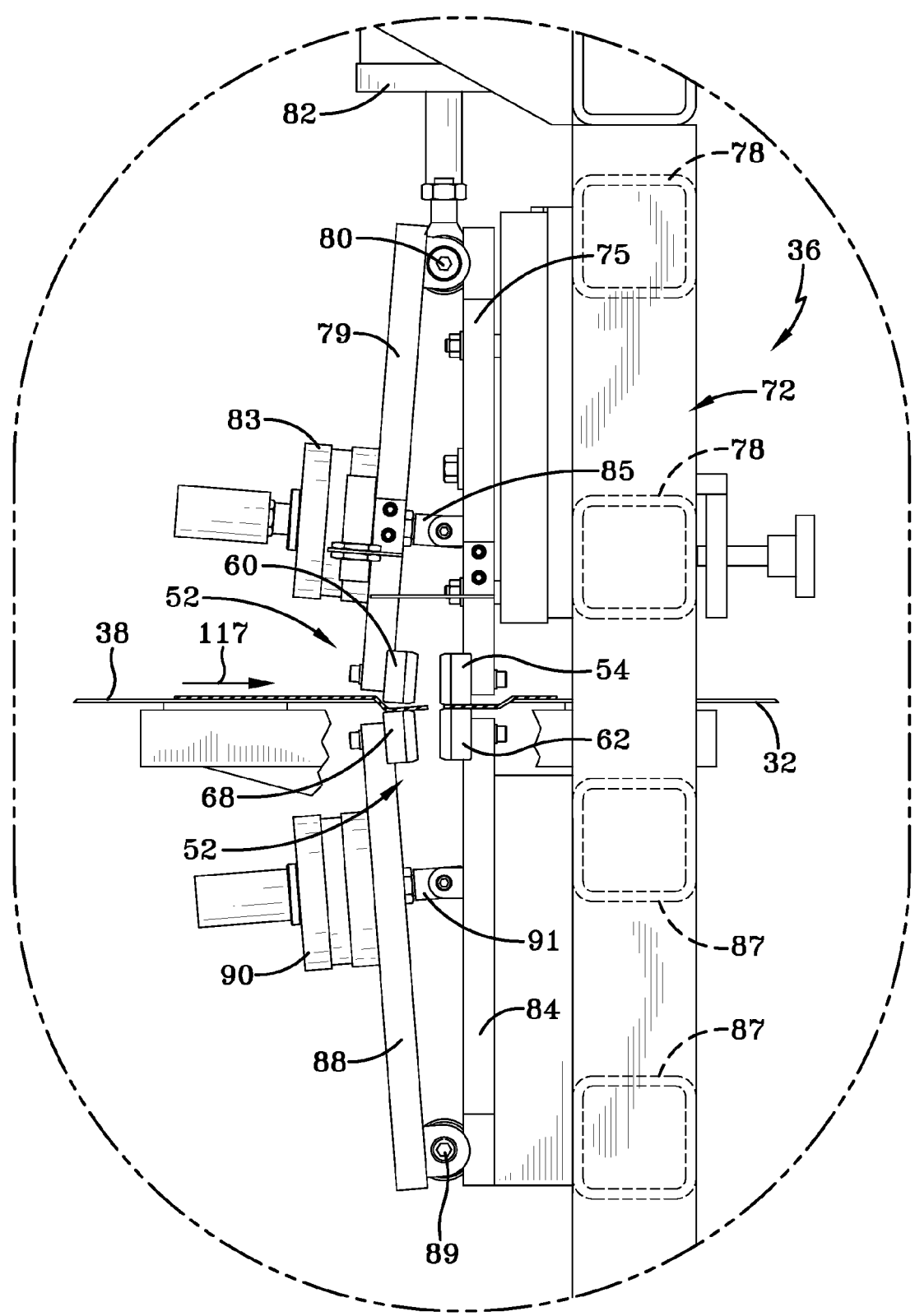
Figure 9:
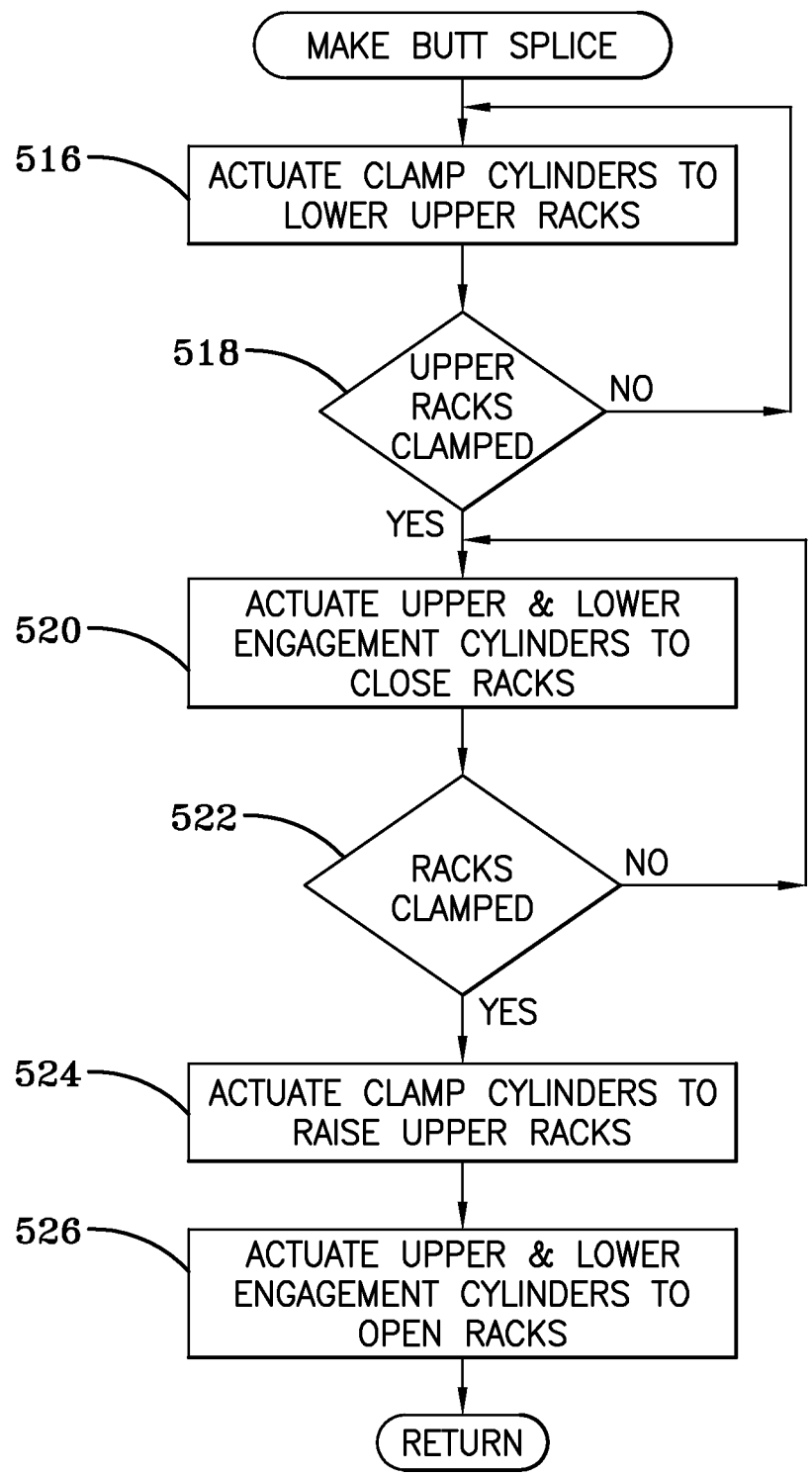
FIG. 9 is a flowchart of a subroutine implemented by the control system of FIG. 6 for butt splicing the preparation ply materials.

After the edges are at the desired locations, the butt splicer is ready to form a butt splice joining the preparation ply strip 38 with the new cut piece 32. Referring to FIG. 9, a process for making a butt splice begins with the control 98 providing, at 516, an output signal to the solenoid 94a causing the solenoid to switch states and port pressurized air to the clamp cylinders 82. The clamp cylinders simultaneously lower the plurality of upper racks 50 until the upper, downstream racks 60 contact a portion of the preparation ply strip 39 adjacent the trailing edge 110 being supported by respective lower, downstream racks 68. At about the same time, the upper, upstream racks 54 contact a portion of the cut strip 32 adjacent the leading edge 114 being supported by the lower, upstream racks 62 as shown in FIG. 8A. The time required to move the upper racks to their clamped position can be measured, and the control 98 can be programmed to initiate an internal timer equal to that clamping operation time. Therefore, when that timer expires, the control 98 then determines, at 518, that the upper pairs of racks 50 have been moved to their respective desired clamped positions.

Figure 8B:
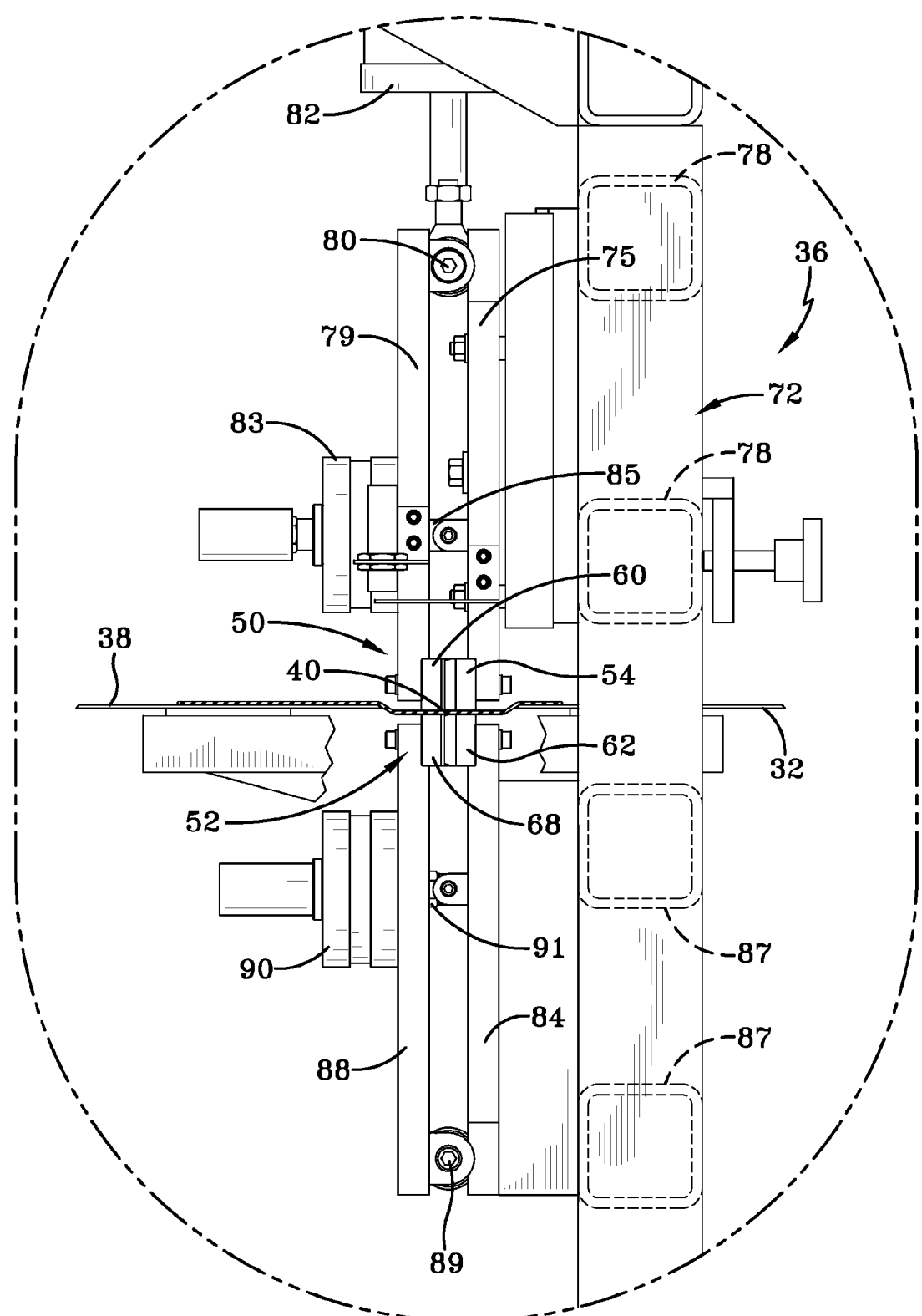

Thereafter, the control 98 then provides, at 520, output signals to solenoids 94b, 94c to change the states of those solenoids and port pressurized air into the upper and lower engagement cylinders 83, 90, respectively. The engagement cylinders 83, 90 are effective to move the upper and lower, downstream racks 60, 68 toward their mating upper and lower, upstream racks 54, 62. The clamped upper and lower, downstream racks 60, 68 move the preparation ply 38 in an upstream direction 117 (FIG. 8A) to bring the preparation ply strip trailing edge 110 into contact with the cut piece leading edge 114 in an abutting relationship. Continued motion of the upper and lower, downstream racks 60, 68 firmly forces the preparation ply strip trailing edge 110 against the cut piece leading edge 114 to form the butt splice 40 (FIG. 8B). The tackiness of the elastomeric material helps to maintain the cut piece leading edge 114 in intimate contact with the preparation ply strip trailing edge 110. That motion continues until the teeth 58, 66 of the respective upper and lower, downstream racks 60, 68 are fully engaged with the teeth 56, 64 of the respective upper and lower, upstream racks 54, 62 as shown in FIG. 8B.

Figure 8C:
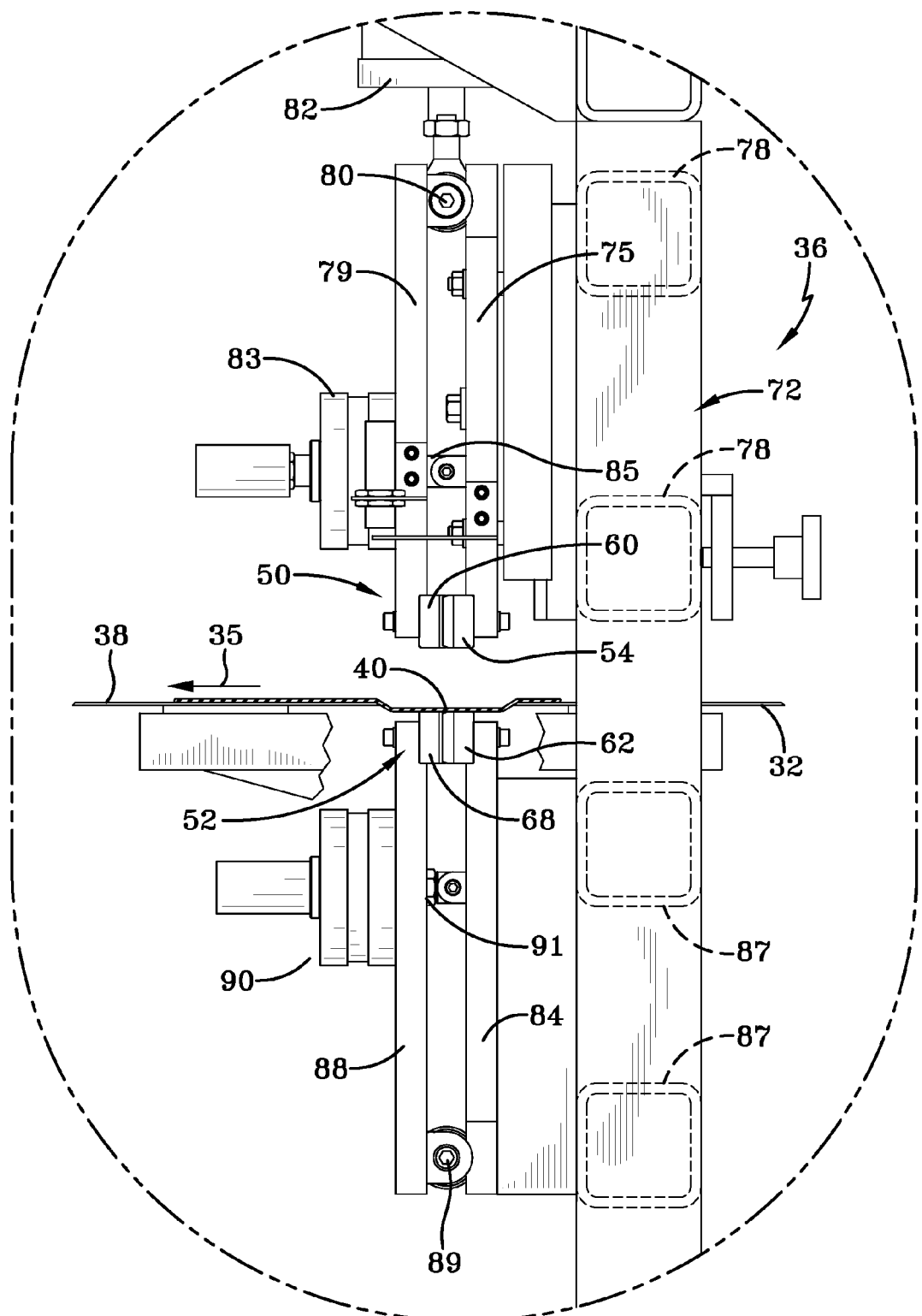

Once again, as previously described, the control 98 is able, by means of an internal timer, to determine, at 522, that the upper and lower, downstream racks 60, 68 are fully engaged with respective upper and lower, upstream racks 54, 62. At that point, the control 98 provides, at 524, an output signal to switch the state of solenoid 94a, thereby reversing the porting of pressurized air to the clamp cylinders 82. The actuation of the clamp cylinders 82 causes the pairs of upper racks 50 to be raised and moved back to their unclamped position as shown in FIG. 8C. Immediately thereafter, the control 98 provides, at 526, output signals to the solenoids 94b, 94c to switch the states of the upper and lower engagement cylinders 83, 90, thereby moving the upper and lower, downstream racks 60, 68 in the downstream direction 35 away from the upper and lower, upstream racks 54, 62. That operation causes the racks to open to a position illustrated in FIG. 8.

In the above process, it should be noted that as the upper and lower, downstream racks 60, 68 move toward the respective upstream racks 54, 62, the downstream racks 60, 68 and the preparation ply 38 move simultaneously. However, after the preparation ply trailing edge 110 contacts the cut piece leading edge 114, the upper and lower, downstream racks 60, 68 have a relative motion with respect to the preparation ply strip 38 and therefore, must slide over the major surfaces of the preparation ply strip 38 without causing damage. To facilitate this, the sides 93 of the pivoting, downstream racks 60, 68 are coated with a "TEFLON" material. In addition, the teeth of the upper and lower, downstream racks 60, 68 are beveled at their leading edge of contact, that is, the surface 92 (FIG. 4). The exact configuration of a beveled surface 92 is application dependent and varies with the nature of the ply material, the length of the racks, etc. In some applications, the beveled surface 92 has an angle of about 10° with respect to the side surface 93 of the rack; whereas, in other applications, the beveled surface has an angle of about 20°. The angle providing the best performance is determined experimentally by trial and error. Similarly, the desired length of the beveled surface 92 and its desired depth from the side surface 93 is also determined experimentally by trial and error. Such a beveled surface 92 facilitates a sliding motion of the downstream racks 60, 68 over the preparation ply strip 38 without gouging it or otherwise causing damage.

Figure 10:
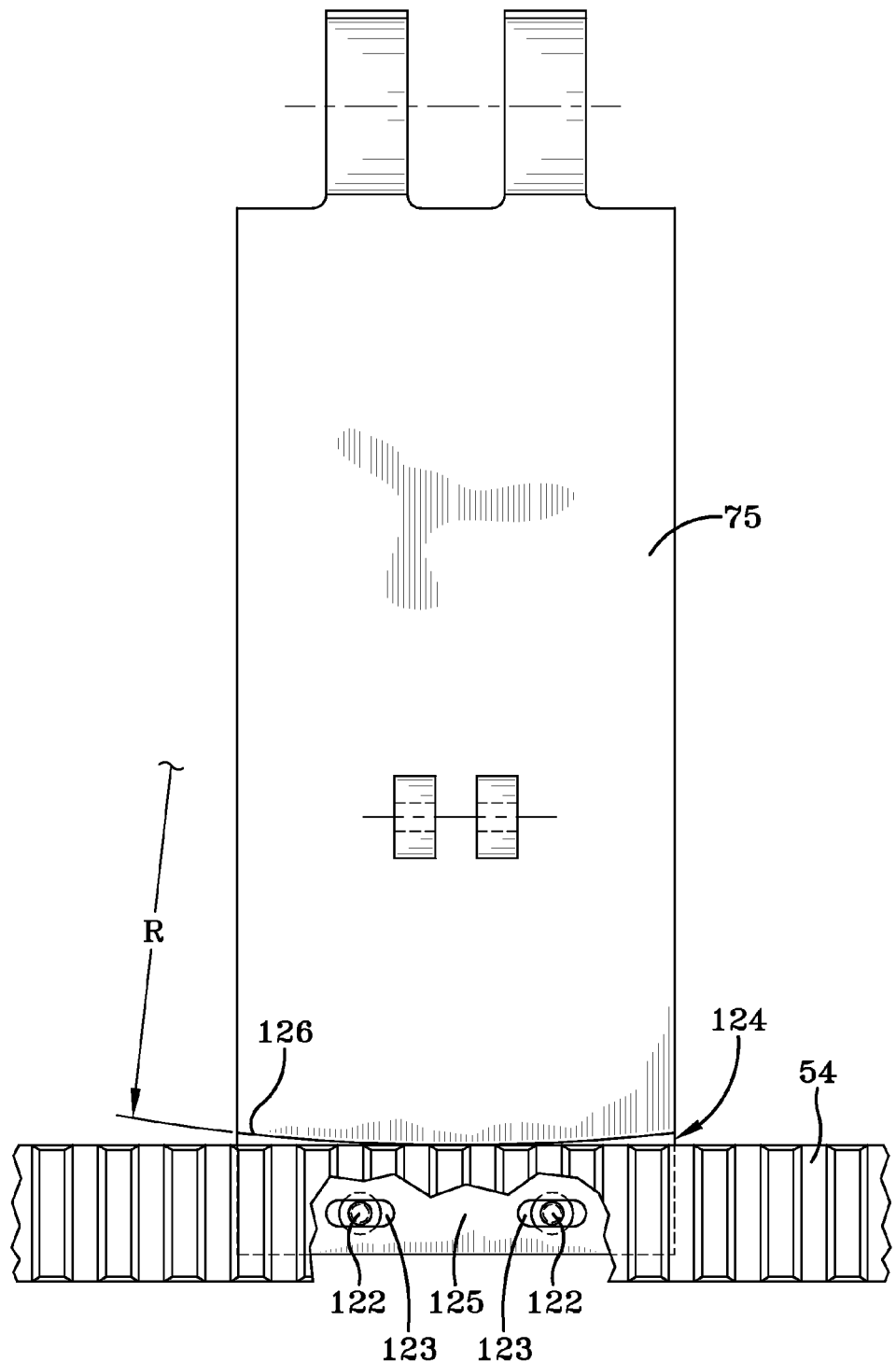
FIG. 10 illustrates how the upper pairs of racks are nonrigidly mounted in jaw mounting brackets on the butt splicer of FIG. 2.

In operating the butt splicer 36, it has been found that having a plurality of pairs of upper and lower racks 50, 52 provides a more consistent, higher quality butt splice than if the upper and lower racks 50, 52 extended continuously across a full width of the butt splicer 36. The reliability and quality of the butt splice is further improved by nonrigidly mounting the upper racks 54, 60 to respective upper jaw mounting brackets 75, 79. The nonrigid mountings of the racks 54, 60 are identical; and the mounting of rack 54 onto jaw mounting bracket 75 is shown in FIG. 10. Shoulder bolts 122 have shoulders that extend through slots 123 in the jaw mounting bracket 75 and threadedly engage the rack 54. Thus, the rack 54 is not rigidly mounted to the respective jaw mounting bracket but is free to move relative thereto by an amount depending on the size of the slots 123. Further, the end of the jaw mounting bracket 75 has a generally L-shaped notch 124 extending across a width of the jaw mounting bracket 75. The slots 123 intersect a first notch surface 125 that contacts a rear surface of the rack 54. A perpendicular surface 126 of the notch is curved, for example, with a 30 inch radius, to allow the rack 54 to rock thereon. It has been determined that such nonrigidly mounting of the upper racks 54, 60 to respective jaw mounting brackets 75, 79 substantially improves the quality of the butt splice 40.

The operation of the butt splicer 36 is effective to provide reliable and high quality butt joints in the formation of a preparation ply strip. Further, it should be noted that the butt splicer 36 can be used to form butt splices that are substantially perpendicular to the infeed conveyor 34 as well as butt splices that are oblique with, or angled slightly from a perpendicular to the infeed conveyor 34. Referring to FIG. 3, a forward leg 131 of the frame 72 of the butt splicer 36 is pivotally mounted to a base plate 132. A rearward leg (not shown) of the frame 72 is supported by a caster 133 that rides on the base plate 132. A ballscrew and nut assembly 134 is connected between the rearward leg and a handwheel 135. Turning the handwheel 135 rotates the ballscrew and causes the nut that is pivotally attached to the rearward leg of the frame 72 to travel along the ball screw. As the nut is moved, the rearward leg of the frame 72 pivots with respect to the forward leg 131, thereby skewing the rows of upper and lower racks 50, 52 with respect to a line perpendicular to a longitudinal centerline of the infeed conveyor 34. An indicator associated with the handwheel 135 is calibrated in one degree increments. Permitting the frame 72 to be pivoted through an angle of up to about 10 degrees is sufficient for most applications.

It has been found that for preparation ply strips made with nonmetallic cords, the butt joint is stronger and more stable during the tire manufacturing process if it is covered with a gum strip. For the most efficient operation, the gum strip applier 44 operates simultaneously with the butt slicer 36. Therefore, the gum strip applier 44 is positioned with respect to the butt splicer 36 such that, simultaneously with the preparation ply trailing edge being positioned at the butt splicer 36, the most recently formed butt splice is positioned at a location at which a gum strip can be applied by the gum strip applier 44.

Figure 11:
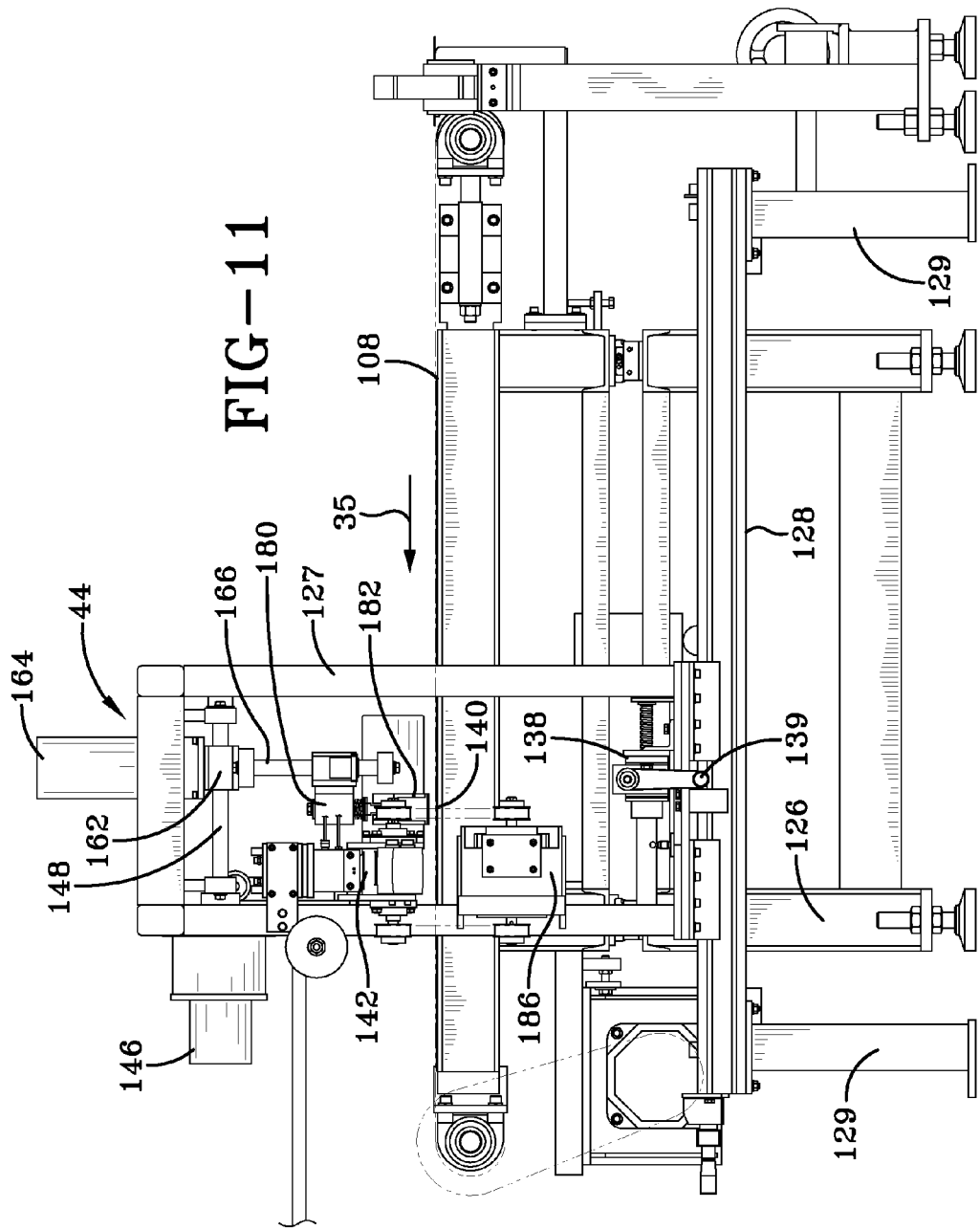
FIG. 11 is an end view of the gum applier of FIG. 2.
Figure 12:
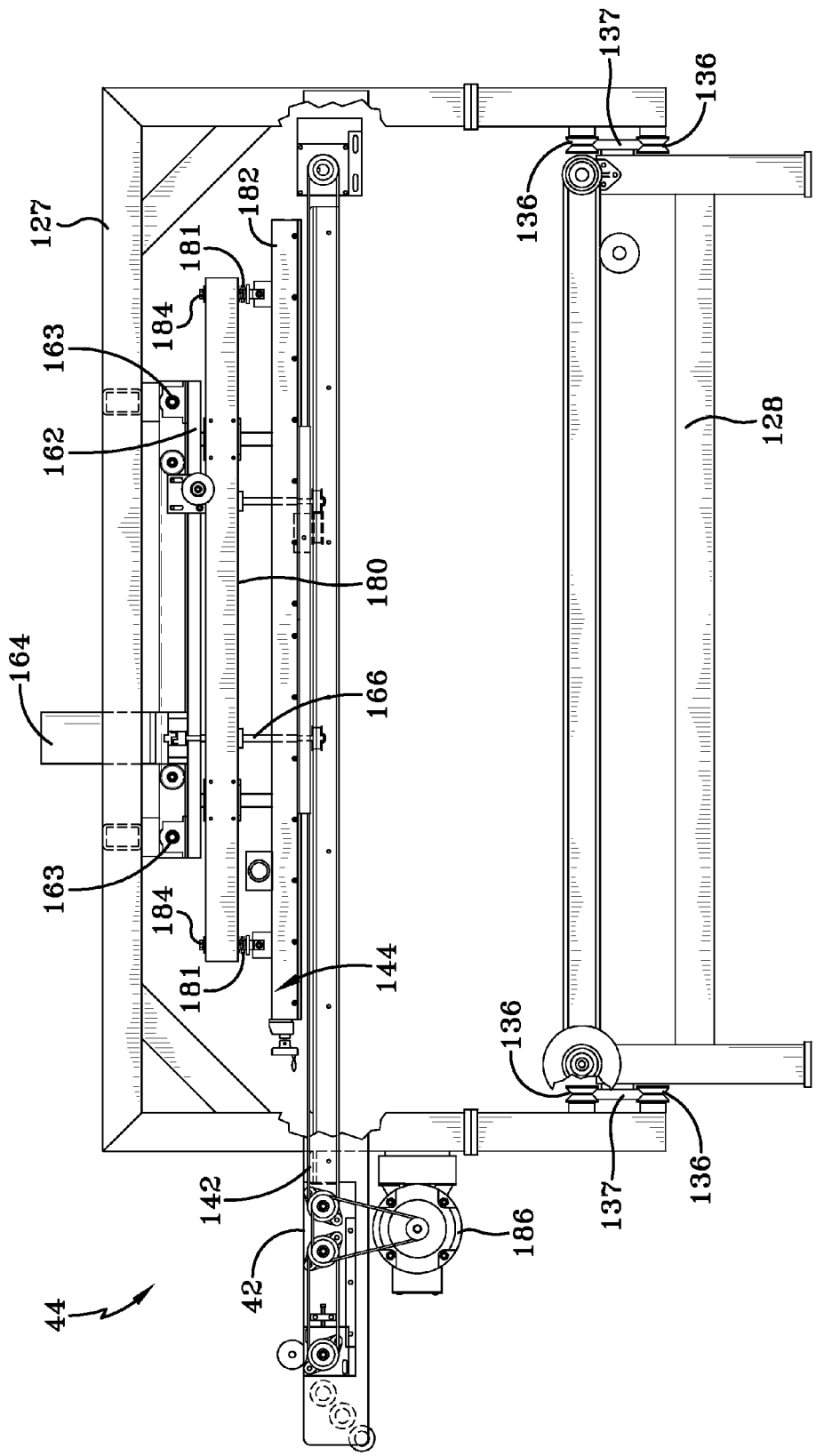
FIG. 12 is a side view of the gum applier of FIG. 2.

Referring to FIG. 11, outfeed conveyor 108 is supported by a base 126. The gum strip applier 44 has a frame 127 that is independently supported by a base 128 having legs 129. Thus, the outfeed conveyor 108 and gum strip applier 44 are independently positionable with respect to the butt splicer 36. The gum strip applier 44 is positioned such that when a butt splice is being formed on the butt splicer 36, a previously made butt splice is located on outfeed conveyor 108 at a location 140 permitting the gum strip applier 44 to apply a gum strip to the previously made butt splice. Referring to FIG. 12, the gum strip applier 44 has a gum strip conveyor 142 and a vacuum head assembly 144. The vacuum head assembly 144 has two degrees of freedom that permit it to remove a gum strip from the conveyor 142 and place it on a butt splice positioned at the upstream location 140.

Figure 13:
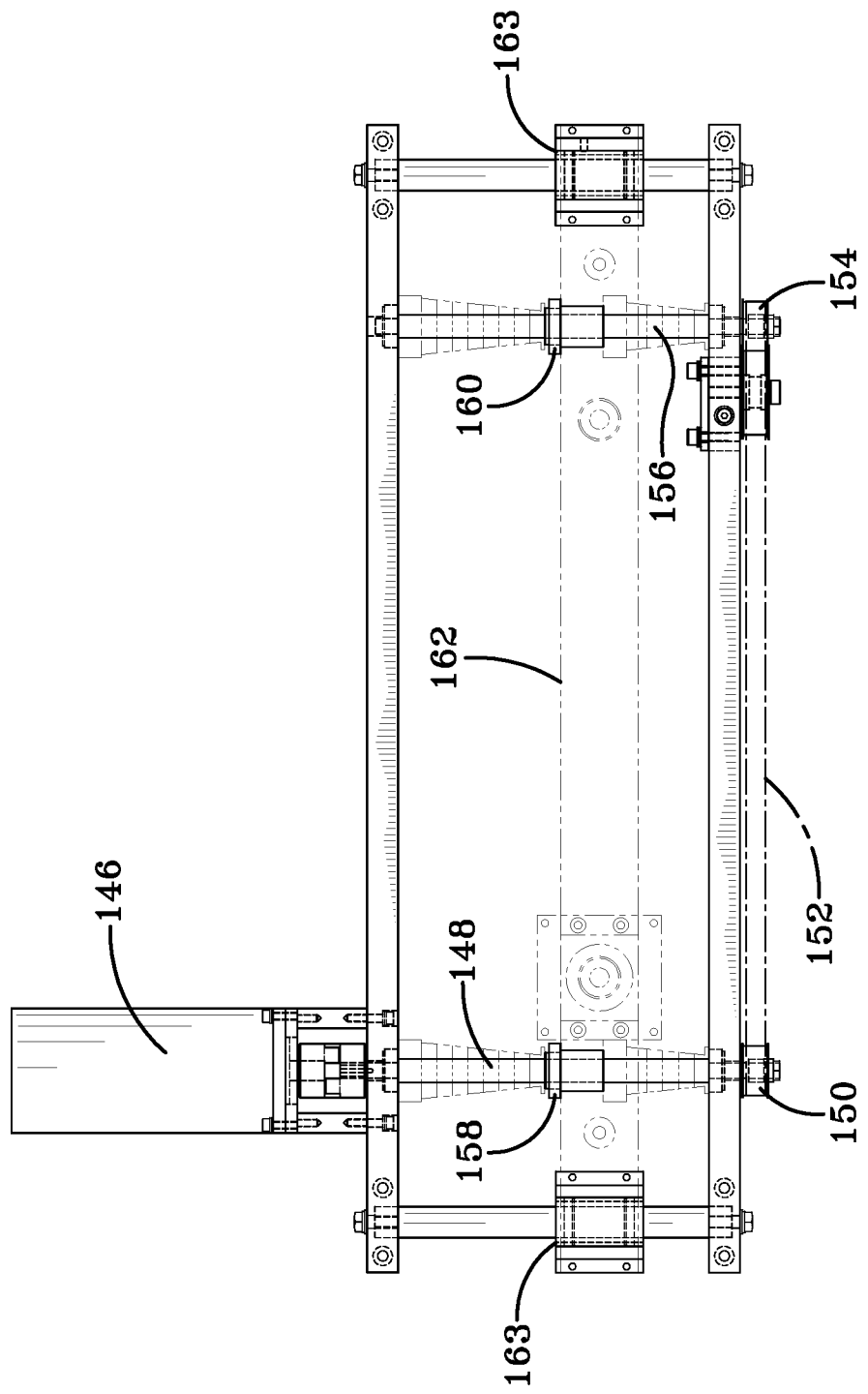
FIG. 13 is a partial top view of the gum applier of FIG. 2 illustrating the horizontal drive components.

Referring to FIG. 13, an X-axis, horizontal drive motor 146 is mechanically connected to one end of a ball screw 148; and a sprocket 150 is mounted on an opposite end of the ball screw 148 and operatively engages a timing belt 152. The timing belt 152 is further connected to a second sprocket 154 mounted on an end of a second ball screw 156. The ball screws 148, 156 have respective ball nuts 158, 160 that support and carry a carriage 162 that is supported and guided in its linear motion by linear bearings 163. As shown in FIG. 13, the carriage 162 supports the vacuum head assembly 144. The vacuum head assembly 144 has a length substantially equal to the length of the butt splice, that is, the full width of the preparation ply strip. Rotation of the horizontal drive motor 146 is operative to simultaneously move the ball nuts 158, 160 (FIG. 13), the carriage 162 and the vacuum head assembly 144 in a horizontal direction substantially parallel to a longitudinal axis of the preparation ply strip.

Figure 14:
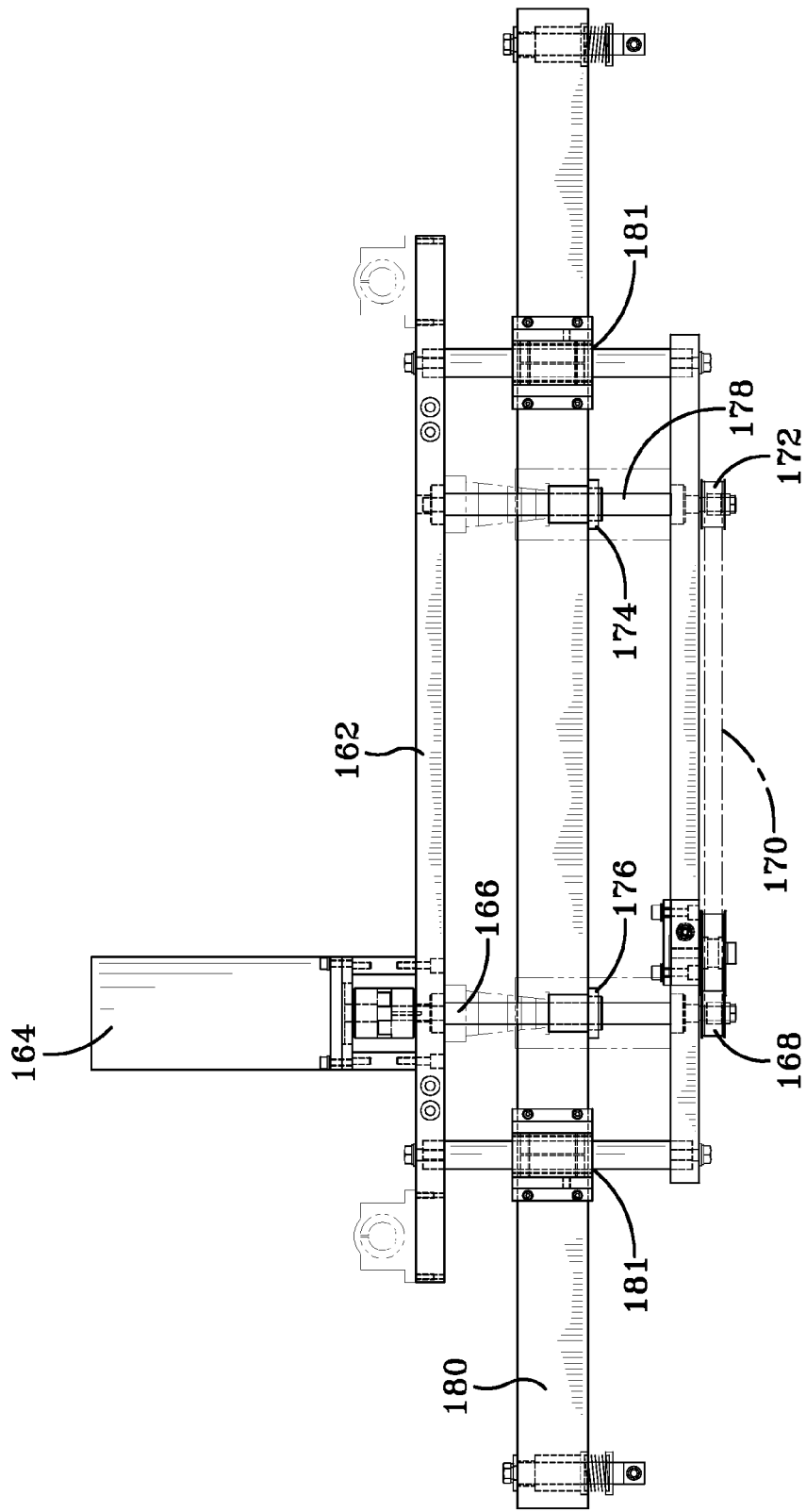
FIG. 14 is a partial end view of the gum applier of FIG. 2 illustrating the vertical drive components.

Referring to FIG. 14, a Z-axis vertical drive motor 164 is mounted on, and supported by, the carriage 162 and is mechanically connected to one end of a first ball screw 166. A first timing sprocket 168 is mounted on an opposite end of the first ball screw 166 and operatively engages a timing belt 170 that also engages a sprocket 172 mounted on an end of a second ball screw 174. First and second ball nuts 176, 178 are rotatably mounted on the respective ball screws 166, 178 and are connected to a vacuum head plenum 180, which is guided in its linear motion by linear bearings 181.

Referring to FIG. 12, a vacuum head 182 is supported by vertical posts 184 that are fixed to the plenum 180. Biasing components, for example, compression springs 181, are mounted on the posts 184 between the vacuum head 182 and the plenum 180. The vacuum head 182 has a length that extends across substantially the whole width of the outfeed conveyor as well as the length of a butt splice in the preparation ply strip. Thus, operation of the vertical drive motor 164 causes the vacuum plenum 180 and vacuum head 182 to raise and lower with respect to the outfeed conveyor 108.

Referring to FIG. 6B, the control 98 provides output signals to the strip conveyor motor 186 and receives input pulses from a strip conveyor encoder 188 by which the control 98 can determine the linear motion of the strip conveyor 142. Similarly, in response to output signals commanding the operation of the horizontal and vertical drive motors 146, 164, the control 98 receives feedback signals from the encoders 190, 192 representing motion of the vacuum head 182. The control 98 is also operatively connected to a vacuum pump 194 that applies the partial vacuum pressure to the vacuum head plenum 180. A vacuum is applied and released from the vacuum head 182 by means of a vacuum release valve 196 connected between the vacuum head plenum and the vacuum head 182. When in its first state, the valve 196 closes the vacuum head to atmosphere and opens it to the vacuum head plenum 180, thereby applying a partial vacuum to the vacuum head 182. In its opposite state, the valve 196 closes the connection between the vacuum head 182 and the vacuum head plenum 180 and opens the vacuum head 182 to atmosphere, thereby dissipating the partial vacuum therein. The control 98 is also connected to a solenoid 94e that is operative to change the state of a knife cylinder 198, thereby operating a knife 200 on the gum strip preparation equipment 48 (FIG. 2) for cutting the gum strips to desired lengths.

Figure 15:
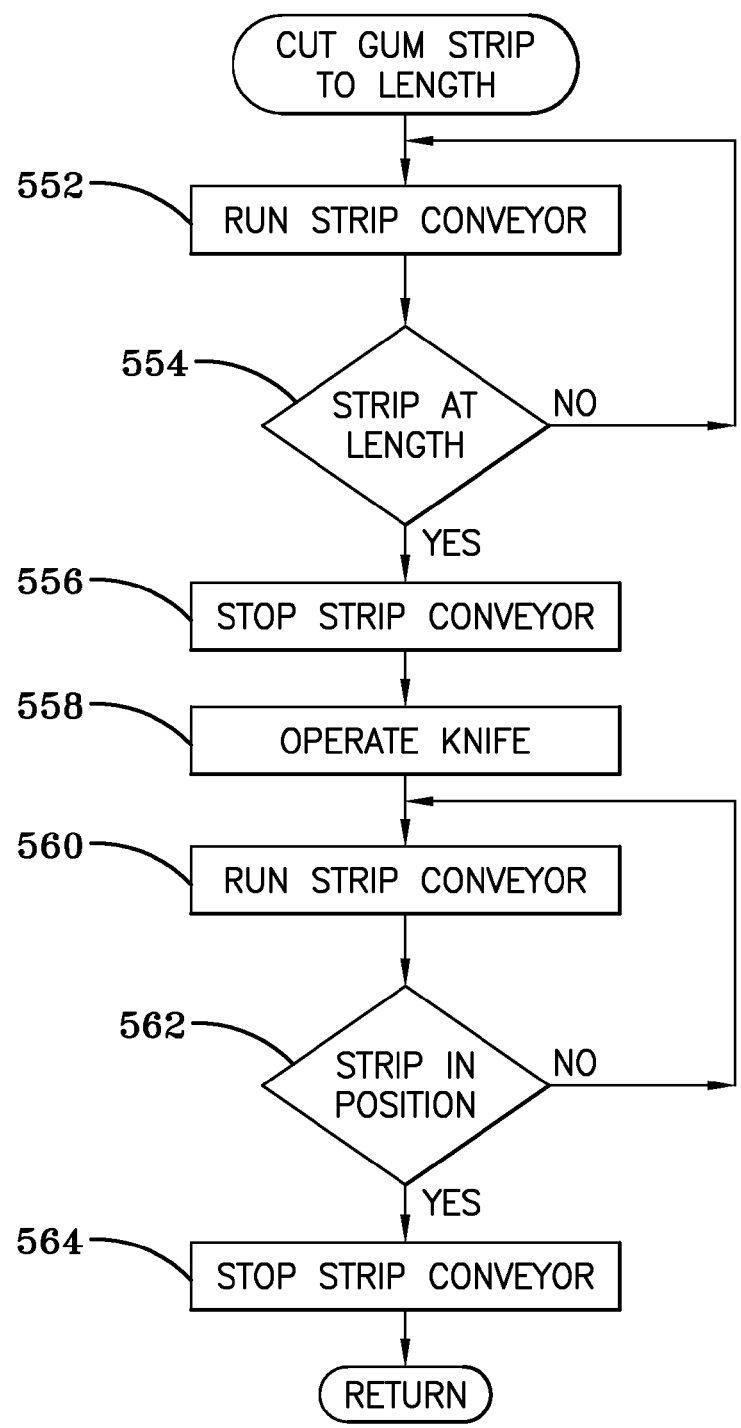
FIG. 15 is a flowchart of a subroutine implemented by the control system of FIG. 6 for cutting a gum strip to length.

There are three independent but coordinated operations or subroutines that are executed by the gum strip applier 44. Referring to FIG. 12, first, a gum strip 42 is moved by the conveyor 142 to a location ready for transfer to the vacuum head 182. A second operation is for the vacuum head 182 to pick up the gum strip from the conveyor 142 and be ready to apply the gum strip to the butt joint. A third operation is to apply the gum strip to the butt joint after the butt joint has been moved to the desired location 140 (FIG. 11). Referring to FIGS. 6B, 12 and 15, to cut a gum strip to length, the control 98 provides, at 552, an output signal to operate the strip conveyor motor 186, thereby causing the strip conveyor 142 to feed the gum strip. As the gum strip 42 is fed, the control 98 monitors and counts output pulses from the strip conveyor encoder 188. When the control 98 counts, at 554, a number of pulses equal to the desired length of the gum strip, the control 98 provides, at 556, an output signal commanding the strip conveyor motor 186 to stop. Thereafter, the control 98 provides, at 558, an output signal commanding the solenoid 94e to change state, thereby porting pressurized fluid to the knife cylinder 198 and operating the knife 200. Immediately thereafter, the output signal from the control 98 changes state, thereby reversing the state of solenoid 94e and returning the knife cylinder 198 to its original position. That operation of actuating the knife cylinder reciprocates the knife 200 and establishes a cut end of the gum strip 145. This action provides a gum strip on the strip conveyor 142 that is of the desired length, that is, the length of the butt strip 40.

Thereafter, the control 98 provides, at 560, an output signal commanding the strip conveyor motor 186 to start; and the strip conveyor 142 transports the gum strip 42 across the width of the outfeed conveyor 108. Again, the control 98 is monitoring and counting output pulses from the strip conveyor encoder 188 and is able to determine when the cut gum strip is in its desired position. When that position is detected, at 562, the control 98 provides, at 564, an output signal commanding the strip conveyor motor 186 to stop. At this point, a gum strip 42 of the desired length is located on the strip conveyor 142 at a location ready to be picked up by the vacuum head 182.

Figure 16:
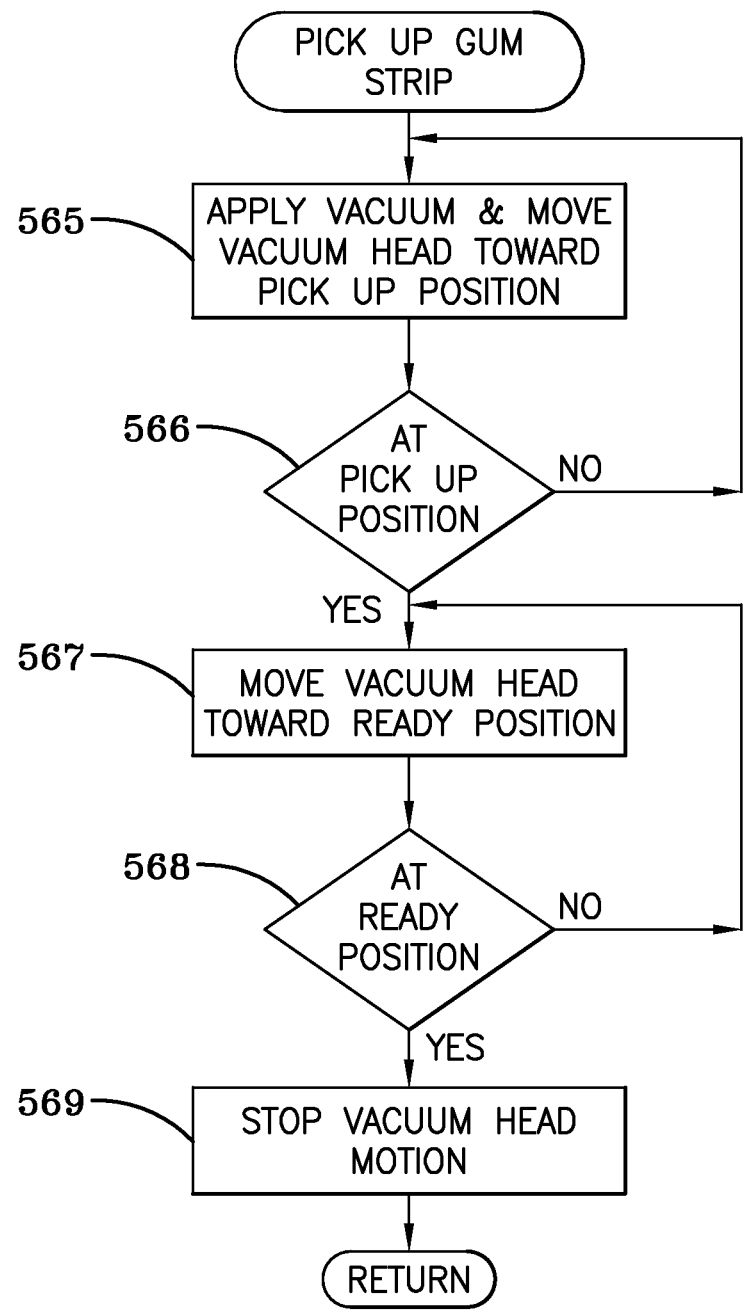
FIG. 16 is a flowchart of a subroutine implemented by the control system of FIG. 6 for picking up the gum strip with the vacuum head.
Figure 17:
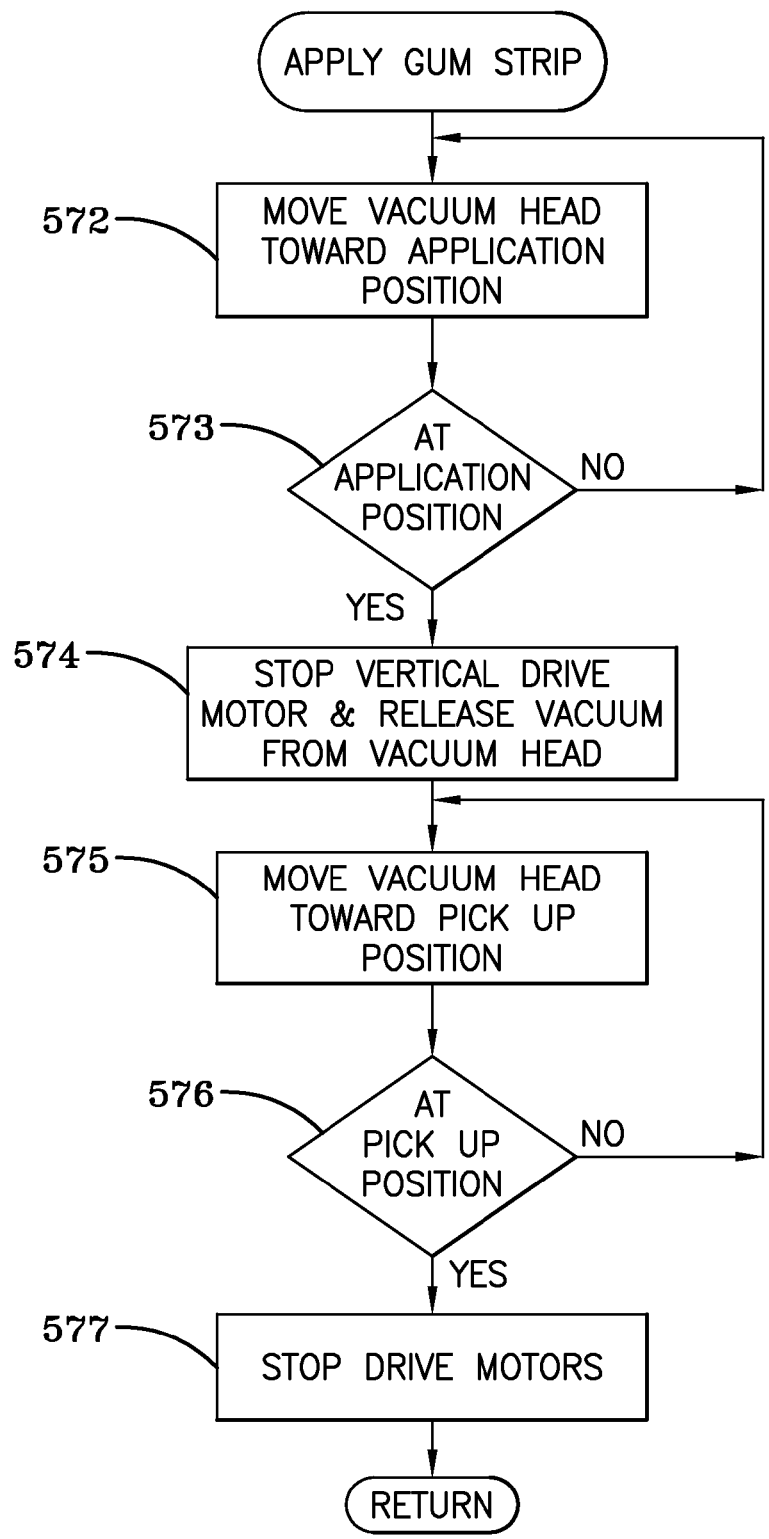
FIG. 17 is a flowchart of a subroutine implemented by the control system of FIG. 6 for applying the gum strip with the vacuum head.

Referring to FIGS. 6B, 11 and 16, to pick up the gum strip from the gum strip conveyor 142, assume that the vacuum head 182 is elevated and the carriage 162 is positioned to locate the vacuum head 182 at a downstream location above the gum strip conveyor 142, ready to pick up a gum strip. The control 98 provides, at 565, an output signal to the vacuum release valve 196 closing the vacuum head 182 to atmosphere and opening the vacuum head to the vacuum head plenum 180. A vacuum is then applied to the vacuum head 182. The control 98 also provides, at 565, output signals to the Z-axis, vertical drive motor 164, thereby rotating the ball screws 166, 174 in a direction to move the vacuum head 182 vertically downward toward the gum strip conveyor 142. The control monitors and counts output pulses from the vertical drive encoder 192 and detects, at 566, when the vacuum head 182 is at its desired position immediately above the strip conveyor 142. At that position, the vacuum head 182 is sufficiently close to the strip conveyor 142 that the vacuum head 182 is able to lift the gum strip off of the gum strip conveyor 142.

The control 98 then provides, at 567, output signals to the Z-axis vertical drive motor 164 and the X-axis horizontal drive motor 146 causing the vacuum head to move to a ready position immediately above the location 140 at which the butt joint is located. As will be appreciated, the control 98 can be programmed to first operate the vertical drive motor 164 to raise the vacuum head 182 and thereafter, operate the horizontal drive motor 146 to move the vacuum head horizontally to a ready position over the butt joint location 140. Alternatively, in other applications, the motors 146 and 164 can be operated simultaneously to move the vacuum head 182 to the ready position. In either embodiment, the control signal monitors output pulses from the encoders 190, 192 in a manner previously described to detect, at 568, that the vacuum head 182 is at the ready position. Thereafter, the control 98 provides, at 569, output signals to the either or both of the motors 146, 164 commanding them to stop the vacuum head 182 at the ready position.

Referring to FIGS. 6B, 11, 12 and 17, to apply the gum strip to the butt joint, assume that a butt joint has been moved to the location 140 beneath the vacuum head 182 at the ready position. The control 98 provides, at 572, output signals to the Z-axis, vertical drive motor 166 rotating ball screws 166, 174 in a direction causing the vacuum head 182 to lower onto and contact the preparation ply strip 38. The gum strip has a length that extends over substantially the whole length of the butt splice. Further, the gum strip has a width such that it extends across the butt splice and over a portion of the major surfaces on both sides of the butt splice 40. The vacuum head 182 is resiliently and movably mounted with respect to the vacuum head plenum 180. Therefore, as the vertical drive motor 164 continues to move the vacuum head plenum 182 downward, the vacuum head 182 contacts the preparation ply strip 38 and the springs 181 apply a desired, downward biasing force against the vacuum head 182, thereby applying a desired application force against the gum strip 42. That force is determined by spring constants of springs 181 and is effective to cause the adhesive on the gum strip 42 to better adhere to the preparation ply strip 38.

Again, the control 98 is monitoring the output pulses from the encoder 190 and detects, at 573, when the vacuum head 182 has been moved to its lowermost position. Thereafter, the control 98 provides, at 574, an output signal to the vertical drive motor 164 commanding it to stop. In addition, the control 98 provides an output signal to the vacuum release valve 196 changing the state of the valve such that the fluid connection between the vacuum head plenum and the vacuum head 182 is blocked, and the vacuum head 182 is open to atmosphere. At this point, the control 98 may allow the vacuum head 182 to dwell at its lowermost position to allow the adhesive on the gum strip to set. Such a dwell time is determined by an internal timer in the control 98 and can be set from zero to any desired number of seconds in a known manner.

Thereafter, the control 98 provides, at 575, output signals commanding the drive motor 146, 162 to move the vacuum head back to the pickup position above the gum strip conveyor 142. In a manner as previously described, the control monitors the encoders 190, 192 to detect, at 576, when the vacuum head 182 is at the pickup position; and thereafter, at 577, the control 98 provides output signals to stop the drive motors 146, 164.

Figure 18:
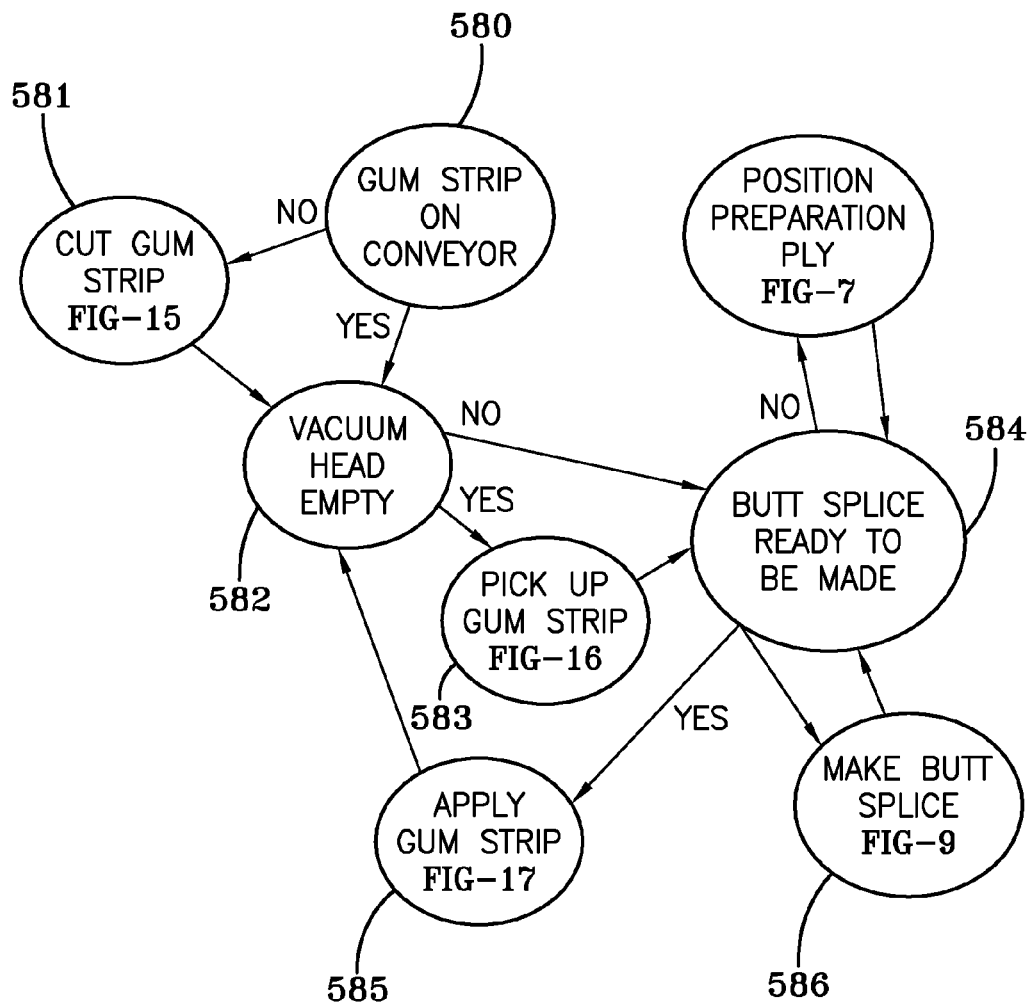
FIG. 18 is a state diagram illustrating the operation of the control system of FIG. 6 for simultaneously operating the butt splicer and gum strip applier of FIG. 2.

As indicated earlier, it is desirable that the gum strip applier 44 operate simultaneously with the butt splicer 36 to apply the gum strip 42 over the most recently formed butt splice while the butt splicer 36 is splicing the next cut piece 32 to the preparation ply strip 38. Therefore, prior to a splice being moved to the position 140, the gum strip applier 44 is operated to prepare a gum strip for application. From the above, it is clear that for a more efficient operation, several of the above processes and subroutines can be operating simultaneously. For example, while a butt splice is being made (FIG. 9) and a gum strip is being applied over a previously made butt splice (FIG. 17), a gum strip can be cut to size and moved into the gum strip applier (FIGS. 15 and 16). FIG. 18 is a state diagram of a program in the control 98 that permits several operations or subroutines to be operated simultaneously.

If at 580, there is no gum strip on the gum strip conveyor 142, the control 98 executes, at 581, the subroutine of FIG. 15 to cut a gum strip to length. If a gum strip is on the conveyor 142, the control 98 determines, at 582, whether the vacuum head is empty; and if so, executes, at 583, the subroutine of FIG. 16 to pick up a gum strip from the conveyor 142. If the vacuum head 182 is holding a gum strip, the control, at 584, determines whether a butt splice is in position and ready to be made. If so, the control, at 585, 586, proceeds to make a butt splice by executing the butt splice subroutine of FIG. 9 and simultaneously apply gum strip to a previously made butt splice by executing the subroutine of FIG. 17. If the control 98, at any time, detects, at 584, that a butt splice is not in position ready to be made, it brings a new cut piece 32 into the butt splicer 36 by executing the position preparation ply subroutine of FIG. 7. The above process provides an economical, efficient and reliable butt splice of preparation plies, thereby providing a higher quality tire manufacturing process.

It should be noted that the location of the gum strip applier 44 can be adjusted with respect to the butt splicer 36 to accommodate different widths of calendered material being supplied to the infeed conveyor 34. Referring to FIG. 12, each side of the gum strip applier frame 127 has grooved rollers 136 that are mounted on opposite sides of a linear guide 137 attached to the base 128. As shown in FIG. 11, a ballscrew and nut assembly 138 is mounted to the base 128. A handwheel 139 is operatively connected to the ballscrew nut and is rotatably mounted to the frame 127. Rotation of the handwheel 139 rotates the ballscrew nut causing it to move the frame 127 and the components supported thereby with respect to the base 128 and the butt splicer 36. Thus, calendered material of different widths can be readily accommodated. It should be noted that when the location of the frame 127 and gum strip conveyor 142 is changed, the feeding of the gum strip 42 from the preparation equipment 48 (FIG. 2) must also be adjusted in a known manner, for example, by moving the location of the equipment 48.

While the present invention has been illustrated by a description of various embodiments and while these embodiments have been described in considerable detail, it is not the intention of Applicants to restrict or in any way limit the scope of the appended claims to such detail. Additional advantages and modifications will readily appear to those skilled in the art. For example, in the described embodiment, the engagement actuators 85, 90 and clamping actuator 82 are described as being pneumatic cylinders; as will be appreciated, in alternative embodiments, those actuators may be hydraulic actuators or electromechanical drive systems.

In the described embodiment, individual clamping cylinders 82 are used for each upper pair of racks 50; however, in an alternative embodiment, all of the pivotable jaw mounting brackets 79, 88 can be mechanically connected to a common drive link that is operated by only one or two actuators. In another alternative embodiment, all of the upper, pivotable jaw mounting brackets 79 can be mechanically connected to a common drive link that is operated by only one or two actuators; and all of the lower, pivotable jaw mounting brackets 88 can be mechanically connected to another common drive link that is operated by only one or two actuators. In the described embodiment, the upper pairs of racks are movable vertically and the lower pairs of racks 52 are fixed in elevation. In alternative embodiments, that arrangement can be reversed with the upper pairs of racks being fixed and the lower pairs of racks being movable.

Further, in the described embodiment, the upper and lower pairs of racks are mounted on the downstream side of the frame 72. Thus, the pivoting racks 60, 68 are located downstream of the nonpivoting racks 54, 62; however, in an alternative embodiment, the upper and lower pairs of racks 50, 52 can be mounted on the opposite, upstream side of the frame 72. In that embodiment, the pivoting racks 60, 68 are located upstream of the nonpivoting racks 54, 62; and the nonpivoting racks 54, 62 hold the preparation ply 38, while the pivoting racks 60, 68 pull the cut piece 32 toward the preparation ply 38 to form the butt splice.

In the described embodiment, the control 98 is depicted as a single unit; however, as will be appreciated, the control 98 can be comprised of several different control units that are in electrical communications with each other. Further, such different control units are often in different locations. For example, one control unit may be placed with the butt splicer 36, another with the gum strip applier 44 and a third with the preparation equipment 48.

Therefore, the invention in its broadest aspects is not limited to the specific details shown and described. Consequently, departures may be made from the details described herein without departing from the spirit and scope of the claims which follow.

What is claimed is:

1. A method for forming a butt joint between ends of first and second plies to splice the first and second plies together, the method comprising:
   providing first and second plies;
   providing pairs of upper racks extending end-to-end having first upper racks pivotable with respect to nonpivotable second upper racks;
   providing pairs of lower racks extending end-to-end adjacent the pairs of upper racks, the pairs of lower racks having first lower racks pivotable with respect to nonpivotable second lower racks;
   positioning an end of the first ply on the first lower racks;
   positioning an end of the second ply on the second lower racks;
   clamping the first and second plies between the pairs of upper racks and the pairs of lower racks;
   pivoting the first upper racks to engage with the nonpivotable second upper racks and pivoting the first lower racks to engage with the nonpivotable second lower racks to move the end of the first ply against the end of the second ply while the second ply is held stationary by the nonpivotable second upper and lower racks, and to firmly press the first and second plies together to define a splice; and
   upon contact between the ends of the first and second plies with one another, sliding the first lower racks over a first surface of the first ply until the first lower racks fully engage with the nonpivotable second lower racks, and sliding the first upper racks over a second surface of the first ply until the first upper racks fully engage with the nonpivotable second upper racks.

2. The method of claim 1 further comprising automatically substantially simultaneously engaging
   all first upper racks with all nonpivotable second upper racks, and
   all first lower racks with all nonpivotable second lower racks.

3. The method of claim 1 further comprising:
   unclamping the first and second plies from between the plurality of pairs of upper and lower racks while the first upper racks and the nonpivotable second upper racks remain fully engaged to one another and the first lower racks and the nonpivotable second lower racks remain fully engaged to one another; and
   disengaging the first upper racks from the nonpivotable second upper racks and the first lower racks from the nonpivotable second lower racks.

4. The method of claim 1, wherein the spliced ends of the first and second plies are oriented substantially parallel to the orientation of a plurality of cords making up the first and second plies.

5. The method of claim 1, further comprising: applying a gum strip over the splice.

6. The method of claim 1, wherein positioning the end of the second ply on the second lower racks includes conveying the second ply in a travel direction toward the pairs of lower racks, the method further comprising:
   sensing a position of the end of the second ply; and
   in response to the sensing, interrupting conveyance of the second ply such that the end of the second ply lies in a predetermined position relative to the pairs of lower racks.

7. The method of claim 6, wherein the pairs of lower racks have teeth, and positioning the end of the second ply on the second lower racks includes interrupting conveyance of the second ply in the travel direction such that the end of the second ply lies over the teeth of the nonpivotable second lower racks at a location spaced from the ends of the teeth by a distance less than about half the length of the teeth.

8. The method of claim 1, wherein positioning the end of the second ply on the nonpivotable second lower racks includes conveying the second ply in a travel direction toward the pairs of lower racks, the travel direction being substantially perpendicular to the splice.

9. The method of claim 1, wherein the first and second plies include non-metallic cords.

10. A method of forming a continuous material ply of the type used to make vehicle tires, the continuous material ply being made by joining material ply sections to define a splice between them, the method comprising:

provding pairs of upper racks having teeth, extending end-to-end, and having first upper racks pivotable with respect to nonpivotable second upper racks;

providing pairs of lower racks having teeth and extending end-to-end adjacent the pairs of upper racks, the pairs of lower racks having first lower racks pivotable with respect to nonpivotable second lower racks;

positioning an end of a first material ply section over teeth of the first lower racks;

positioning an end of a second material ply section over teeth of the nonpivotable second lower racks by conveying the second material ply section in a travel direction toward the pairs of lower racks, the travel direction being substantially perpendicular to the splice;

clamping the first and second material ply sections between the pairs of upper racks and the pairs of lower racks;

pivoting the first upper and first lower racks to simultaneously engage teeth of all first upper racks with teeth of all nonpivotable second upper racks, and teeth of all first lower racks with teeth of all nonpivotable second lower racks to move the end of the first material ply section against the end of the second material ply section while the second material ply section is held stationary by the nonpivotable second upper and lower racks to splice the first and second material ply sections together; and upon contact between the ends of the first and second material ply sections with one another, sliding the first lower racks over a first surface of the first material ply section until the first lower racks fully engage with the nonpivotable second lower racks, and sliding the first upper racks over a second surface of the first ply until the first upper racks fully engage with the nonpivotable second upper racks.

11. The method of claim 10, wherein the first and second material ply sections include non-metallic cords.

* * * * *